United States Patent
Terada et al.

(12)

(10) Patent No.: US 6,510,286 B1
(45) Date of Patent: Jan. 21, 2003

(54) DAMPER DEVICE FOR CAMERA

(75) Inventors: Hiroshi Terada, Mitaka (JP); Tatsuo Takanashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/902,008

(22) Filed: Jul. 10, 2001

(30) Foreign Application Priority Data

Jul. 25, 2000 (JP) ........................................ 2000-224379
Jun. 4, 2001 (JP) ........................................ 2001-168556

(51) Int. Cl.[7] ............................................. G03B 15/03
(52) U.S. Cl. ........................ 396/177; 396/178; 396/448
(58) Field of Search ................................. 396/448, 176, 396/177, 178, 475, 476, 477, 455

(56) References Cited

U.S. PATENT DOCUMENTS 5,743,575 A * 4/1998 McFarland ....................... 16/82
5,794,084 A * 8/1998 Ikari ............................ 396/178

FOREIGN PATENT DOCUMENTS

JP          4-110930          4/1992

* cited by examiner

*Primary Examiner*—David M. Gray
(74) *Attorney, Agent, or Firm*—Frishauf, Holtz, Goodman & Chick, P.C.

(57) ABSTRACT

A strobe device in which a damper device is built has a light-emitting portion main unit containing a flash-emitting tube and other members therein supported by a rotational supporting mechanism having rotational damper functions. The rotational supporting mechanism includes a rotational shaft fixed to the light-emitting portion main unit and a bearing tube fixed to the camera main unit to which the rotational shaft is fit with a slight gap therebetween. Grease is filled and sealed in the gap between the rotational shaft and the bearing, thus configuring the rotational supporting mechanism. When the light-emitting portion main unit rotates toward a pop-up position due to the pressing force of a spring, friction torque of the rotational supporting mechanism acts to suppress the moving speed, and bouncing at the pop-up position is prevented.

11 Claims, 15 Drawing Sheets

DAMPER DEVICE FOR CAMERA

This application claims benefit of Japanese Applications No. 2000-224379 filed in Japan on Jul. 25, 2000, and No. 2001-168556 filed in Japan on Jun. 4, 2001, the contents of which are incorporated by this reference.

BACKGROUND OF THE INVENTION

1. Field of the Invention

The present invention relates to the structure of a damper device for a camera, and more particularly relates to a damper device serving as a shock-absorbing device for a device which moves a movable member of a camera.

2. Description of the Related Art

A strobe device capable of popping up to a usage position where a flash can be emitted (i.e., a light-emitting position) can be given as an example of a moving device in a camera. The conventional strobe device disclosed in Japanese Unexamined Patent Application Publication No. 4-110930 has built-in energy absorbing means for absorbing the kinetic energy occurring at the time of the light-emitting portion of the strobe device moving to the usage position. Due to this energy absorbing means, the shock of the light-emitting portion of the strobe device reaching the usage position is absorbed, without sound or bouncing.

One of the above energy absorbing means is a rubber material or sponge material which the light-emitting portion comes into contact with immediately before reaching the usage position, and another is a shock-absorbing material comprising a shock-absorbing spring which the light-emitting portion comes into contact with immediately before reaching the usage position in the same manner, and a damper head capable of elastically deforming.

However, while the rubber material or sponge material, or combined member of the shock-absorbing spring and the damper head are applied as energy-absorbing means to the strobe device disclosed in Japanese Unexamined Patent Application Publication No. 4-110930, there are irregularities in the forms and properties of these materials, so the probability that such irregularities would affect energy-absorbing capabilities is great, and there has been a problem in that stable and desirable capabilities have not been readily obtainable.

SUMMARY OF THE INVENTION

The present invention has been made to solve the above-described problem, and accordingly, it is an object thereof to provide a damper device for a camera, yielding stable shock-absorbing capabilities with a simple structure.

According to one aspect of the present invention, a damper device for a camera comprises: a rotational moving member; a spring storing deforming energy for moving the rotational moving member; a rotational shaft coupled to the rotational moving member for causing rotational movement of the rotational moving member; a fixed bearing fitted to the rotational shaft, with the rotational shaft being rotatable relative to the fixed bearing; a viscous agent filled in between the rotational shaft and the fixed bearing for consuming the deforming energy stored by the spring while the rotational moving member moves; and a seal member for sealing in the viscous agent filled in between the rotational shaft and the fixed bearing. According to this damper device, the deforming energy possessed by the spring is consumed by the viscous agent at the time of the rotational moving member moving, thereby alleviating the shock due to the movement of the rotational moving member.

According to another aspect of the present invention, a damper device for a camera comprises: a rotational moving member; a spring storing deforming energy for moving the rotational moving member; a rotational bearing coupled to the rotational moving member for causing rotational movement of the rotational moving member; a fixed shaft fitted to the rotational bearing, with the rotational bearing being rotatable relative to the fixed shaft; a viscous agent filled in between the rotational bearing and the fixed shaft for consuming the deforming energy stored by the spring while the rotational moving member moves; and a seal member for sealing in the viscous agent filled in between the rotational bearing and the fixed shaft. According to this damper device, too, the deforming energy possessed by the spring is consumed by the viscous agent at the time of the rotational moving member moving, thereby alleviating the shock due to the movement of the rotational moving member.

According to still another aspect of the present invention, a damper device for a camera comprises: a moving member movably provided on the camera; a spring storing deforming energy for moving the moving member; a guide member for guiding movement of the moving member; a guided member for being guided by the guide member; a viscous agent filled in between the guide member and the guided member for consuming the deforming energy stored by the spring while the moving member moves; and a seal member for sealing in the viscous agent filled in between the guide member and the guided member. According to this damper device, also, the deforming energy possessed by the spring is consumed by the viscous agent at the time of the moving member moving, thereby alleviating the shock due to the movement of the moving member.

Further objects and advantages of the present invention will become apparent from the following description.

DESCRIPTION OF THE PREFERRED EMBODIMENTS

The following is a description of embodiments of the present invention, with reference to the drawings.

Figure 1:
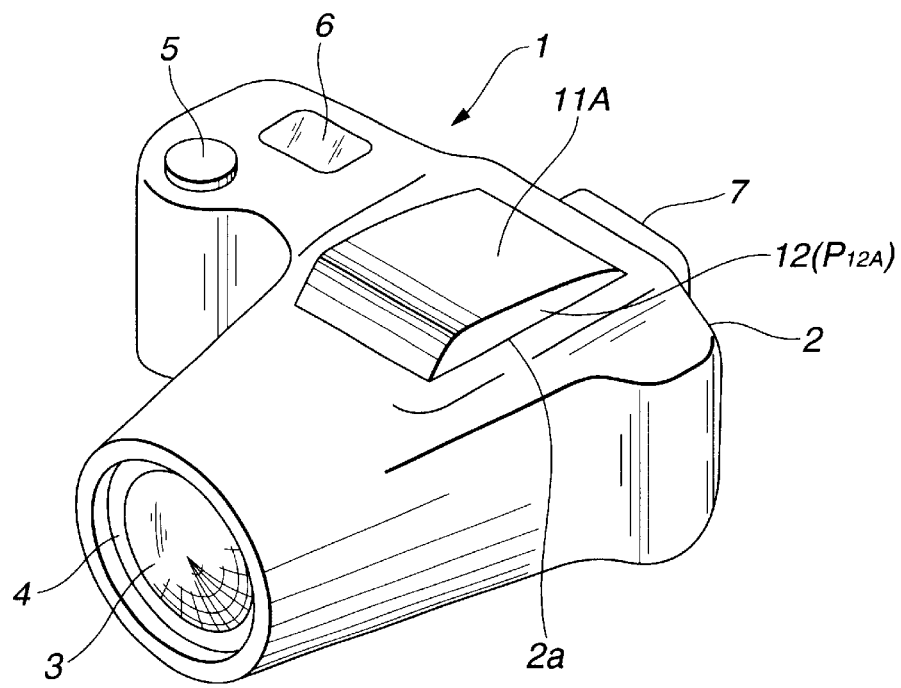
FIG. 1 is a perspective view illustrating an external view of a camera with a built-in strobe device, which is a flash-emitting device, according to a first embodiment of the present invention, in a state with the strobe device stored.
Figure 2:
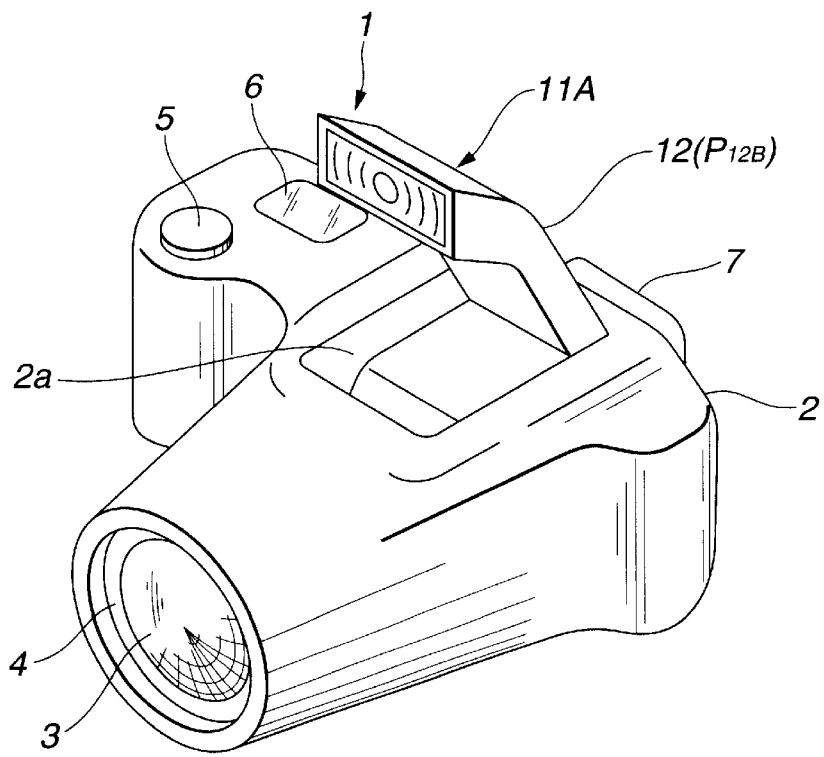
FIG. 2 is a perspective view illustrating an external view of the camera with a built-in strobe device shown in FIG. 1, in a state with the strobe device popped up.
Figure 3:
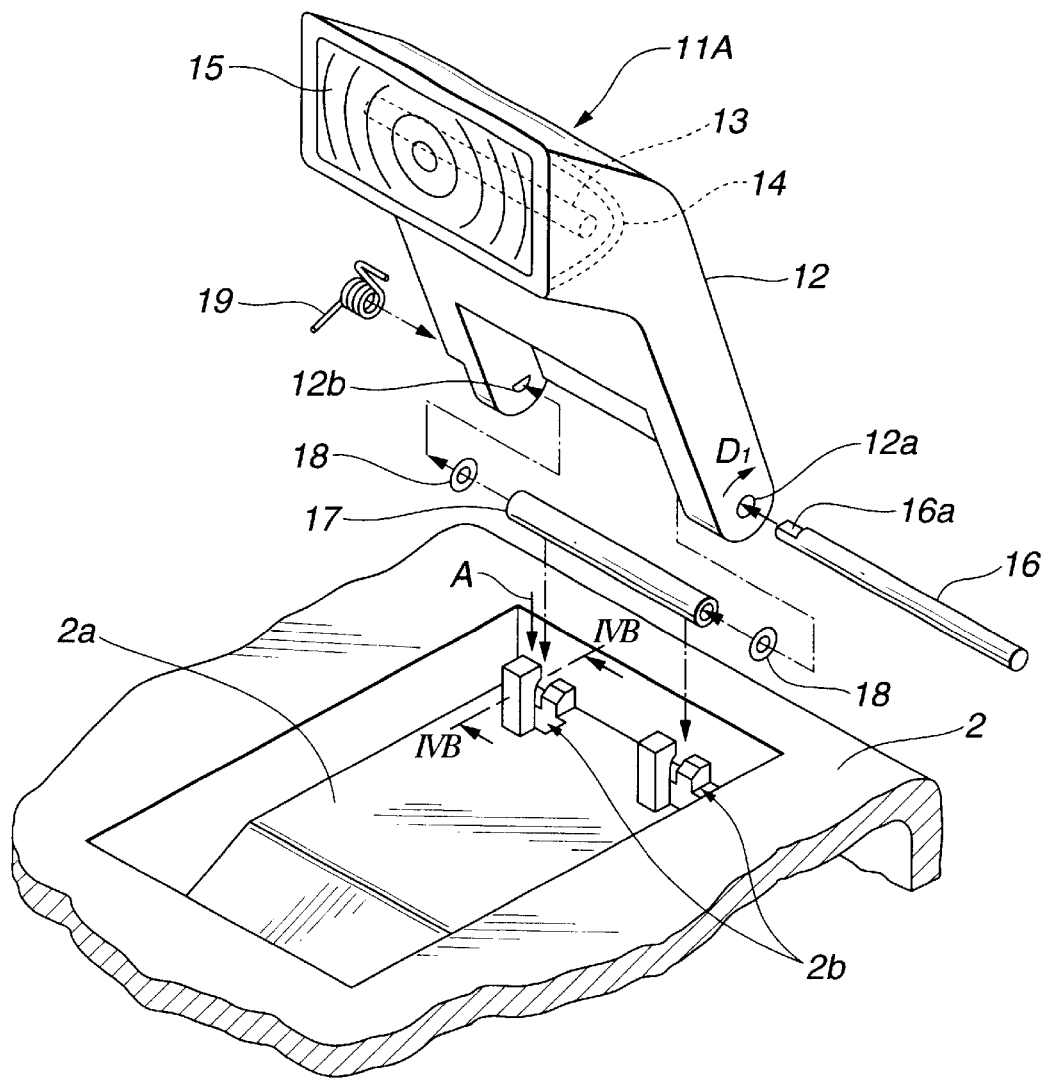
FIG. 3 is a disassembled perspective view of the strobe device shown in FIG. 1.
Figure 4A:
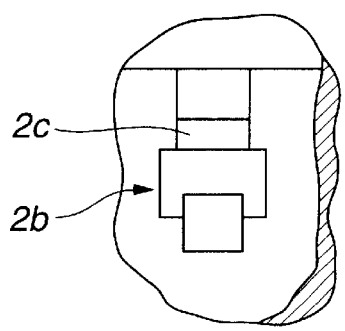
FIG. 4A is a view along a line of view indicated by the arrow A in FIG. 3.
Figure 4B:
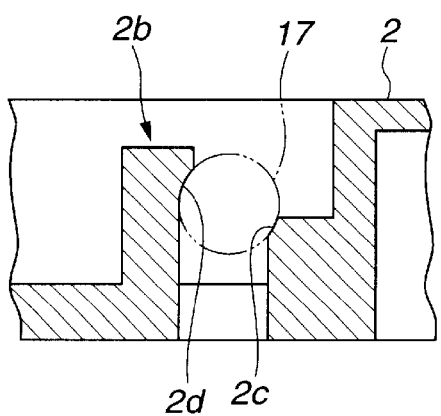
FIG. 4B is a cross-sectional diagram along line IV—IV in FIG. 3.
Figure 5:
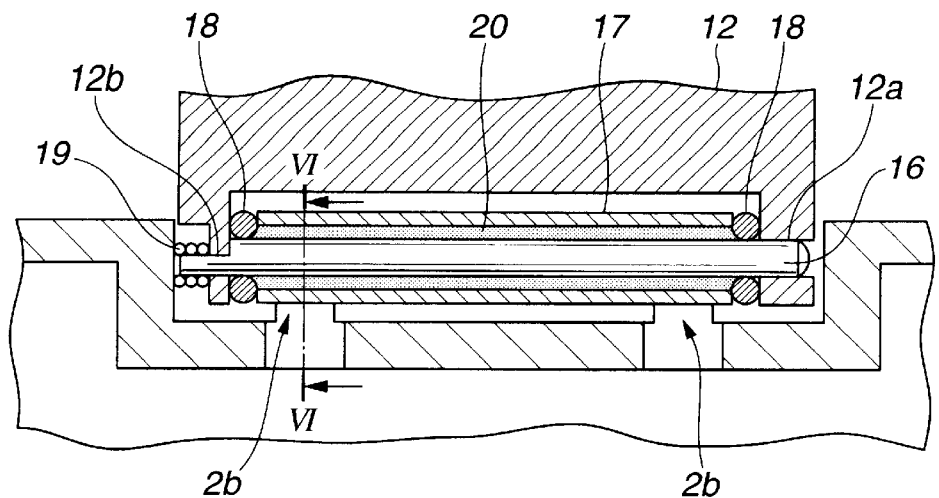
FIG. 5 is a longitudinal-section view of around the bearing portion of the strobe device shown in FIG. 1.
Figure 6:
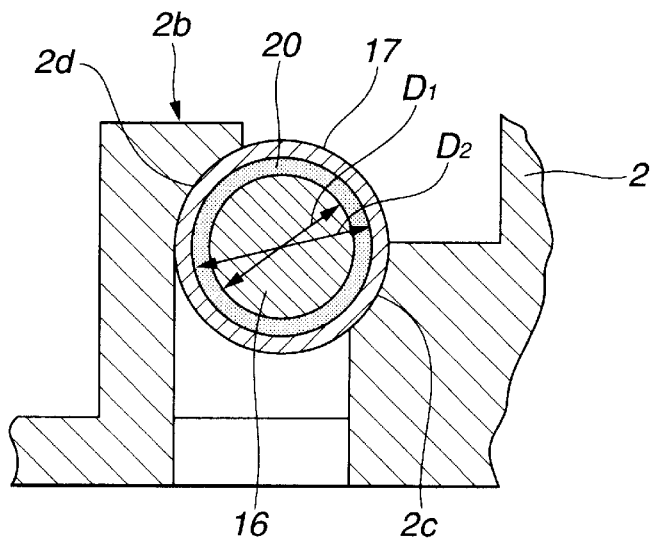
FIG. 6 is a cross-sectional diagram along line VI—VI in FIG. 5.

FIGS. 1 and 2 are perspective views illustrating an external view of a camera with a built-in strobe device, which is a flash-emitting device, according to the first embodiment of the present invention. FIG. 1 illustrates an external view of the camera with the built-in strobe device in a state with the strobe stored, and FIG. 2 illustrates an external view of the camera with shown in a state with the strobe device popped up. FIG. 3 is a disassembled perspective view of the strobe device of the camera. FIGS. 4A and 4B are a view along a line of view indicated by the arrow A in FIG. 3 and a cross-sectional diagram along line IVB—IVB in FIG. 3, respectively, showing the form of the bearing supporting portion. FIG. 5 is a longitudinal-section view of around the bearing portion of the strobe device. FIG. 6 is a cross-sectional diagram along line VI—VI in FIG. 5.

The camera 1 is a single-reflex type with a strobe device attached, comprising a lens barrel 4 having a taking lens 3, a strobe device 11A, and other members such as a photography control unit and so forth. Also disposed on the camera main unit 2 of the camera 1 in addition to the lens barrel 4 and strobe device 11A is a release switch 5, a liquid crystal display unit 6, a viewfinder eyepiece lens unit 7, and so forth.

The strobe device 11A is made up of a light-emitting portion main unit 12 configuring a flash-emitting portion which is a moving member rotatably supported by the camera main unit 2 by a rotational supporting mechanism as shown in FIG. 4, a flash-emitting tube 13 configuring the flash-emitting portion disposed above the light-emitting portion main unit 12, a reflector 14, a light-emitting window 15, a pop-up spring (torsion spring) 19 for providing the light-emitting portion main unit 12 with rotating force in the pop-up direction (i.e., in the clockwise direction D1 in FIG. 3), and the above rotational supporting mechanism.

The light-emitting portion main unit 12 is capable of rotating in a non-light-emitting storage position (first position) P12A where it is stored in a strobe storing chamber 2a to a pop-up position (second position) P12B where it comes into contact with a wall face of the strobe storing chamber 2a so as to be able to emit light. In the state that the light-emitting portion main unit 12 is stored in the strobe storing chamber 2a, the pop-up spring 19 maintains a charged state, that is to say, a state of storing deforming energy.

The rotational supporting mechanism for rotatably supporting the light-emitting portion main unit 12 is a mechanism with a damper device built in, comprising a rotational shaft 16 which is a rotational shaft member having a D-shaped cut face (notched face) 16a on one end thereof, a bearing tube 17 which is a hollow fixed bearing member into which the rotational shaft 16 is inserted with a slight gap therebetween, O-rings (seal rings) 18 which are seal members formed of a rubber material abutting against the rotational shaft 16, grease 20 which is a viscous agent, and two bearing supporting portions 2b provided on the strobe storing chamber 2a of the camera main unit 2.

The bearing supporting portions 2b have lower protrusions 2c and upper protrusions 2d as shown in FIGS. 4A and 4B, and the outer circumference portion of the bearing tube 17 is pressed into both protrusions.

The rotational shaft 16 is pressed into and fixed to a shaft hole 12a and D-shaped hole 12b on the light-emitting portion main unit 12, and inserted through the bearing tube 17 with grease 20 which is a viscous agent being coated thereon, as shown in FIGS. 5 and 6. Or, grease 20 may be injected in the gap after insertion. At this time, the O-rings 18 are inserted to both edges of the rotational shaft 16, and brought into contact with both edges of the bearing tube 17. The grease 20 is sealed in by the O-rings 18 on either side, thereby preventing leaking out.

With the rotational shaft mounted, both ends of the bearing tube 17 are pressed into the bearing supporting portions 2b of the strobe storing chamber 2a, and fixed. A pop-up spring 19 is inserted to the tip of the rotational shaft 16.

In the assembled state, the rotational shaft 16 is subjected to viscous friction torque as torque due to the shearing resistance of the grease 20 filled in the gap between the bearing tube 17 and the rotational shaft 16 at the time of rotating. That is to say, the rotational supporting mechanism made up of the rotational shaft 16, bearing tube 17, and grease 20, also functions as a rotating damper.

The magnitude of the viscous friction torque depends on the gap between the outer diameter D1 of the rotational shaft 16 and the inner diameter D2 of the bearing tube 17 as shown in FIG. 6, and the viscosity of the grease 20 to be filled therein. These dimensions, type of grease, and other settings are determined such that an appropriate rotational speed is obtained at the time of the pop-up action of the light-emitting portion main unit 12, bouncing is suppressed at the time of reaching the pop-up position, and further such that the load resistance is appropriate for the storing operation, as well.

The pop-up and storing actions of the strobe device 11A according to the present embodiment thus configured will now be described.

In the state with the strobe device stored, as shown in FIG. 1, pressing a pop-up operating button not shown in the drawings to release the retaining state, the light-emitting portion main unit 12 rotates from the storage position P12A to the pop-up position P12B shown in FIG. 2, due to the pressing force of the pop-up spring 19. The rotating speed at this time is suppressed to an appropriate low speed by the viscous friction torque of the grease 20 filled in between the bearing tube 17 and the rotational shaft 16, and at the same time the bouncing upon reaching the pop-up position P12B is suppressed by the damping effects thereof. That is, the deforming energy stored in the pop-up spring 19 is consumed by the action of the grease at the time of the damping action. Note that the same sort of energy consumption occurs at the time of the damping operation in the later-described other embodiments, as well.

On the other hand, in order to store the light-emitting portion main unit 12 in the pop-up position P12B back to the storage position P12A, the back side of the light-emitting portion main unit 12 is pressed and rotated against the pressing force of the pop-up spring 19, and thus the light-emitting portion main unit 12 is stored in the strobe storing chamber 2a of the camera main unit. Viscous friction torque of the grease filled in between the bearing tube 17 and the rotational shaft 16 also acts at this time, but the friction torque is of a level that does not impede this operation in particular.

According to the strobe device 11A according to the first embodiment of the present invention as described above, the rotational supporting mechanism having a simple damping device made up of the rotational shaft 16, bearing tube 17, and grease 20, supports the light-emitting portion main unit 12, and accordingly stable low-speed rotation and shock-absorbing capabilities can be obtained at the time of pop-up. Also, the above rotational supporting mechanism is capable of being assembled into spaces where conventional dedicated damper devices could not be provided, thus realizing reduction in size and costs of cameras.

Now, as for the viscous agent filled in the gap between the rotational shaft 16 and bearing tube 17 of the rotational supporting mechanism, silicon oil may be used instead of grease 20. Also, the gap between the rotational shaft 16 and the bearing tube 17 may be of minute dimensions which allow normal relative rotation. For example, the dimensions may be several hundredths of 1 mm.

Figure 7:
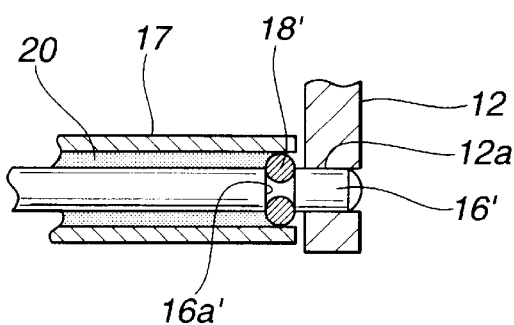
FIG. 7 is a longitudinal-section view of around the bearing portion of a variation of the O-ring mounting structure in the strobe device according to the first embodiment shown in FIG. 1.

Also, as a variation of the O-ring mounting structure abutting against the rotational shaft 16 in the rotational supporting mechanism, the O-ring mounting structure indicated in the longitudinal-section view of around the bearing portion shown in FIG. 7 may be proposed.

In the variation shown in FIG. 7, a ring groove 16a' is provided on the rotational shaft 16', the O-ring 18' is fit into the ring groove 16a', and in this state the assembly is fit into the inner circumference side of the bearing tube 17 such that the outer circumference portion of the O-ring 18' is compressed thereby.

According to the O-ring mounting structure of this variation, there is no need to bring the O-ring 18' into contact with the edge face of the bearing, thereby enabling sealing in a more sure manner. Incidentally, the O-rings 18 and 18' may be sealing rings having cross-sectional forms other than round. The above-described O-ring mounting structure and seal member forms are applicable to the later-described strobe devices according to the other embodiments, as well.

Next, description will be made regarding a second embodiment of the strobe device according to the present invention, which is a flash-emitting device.

Figure 8:
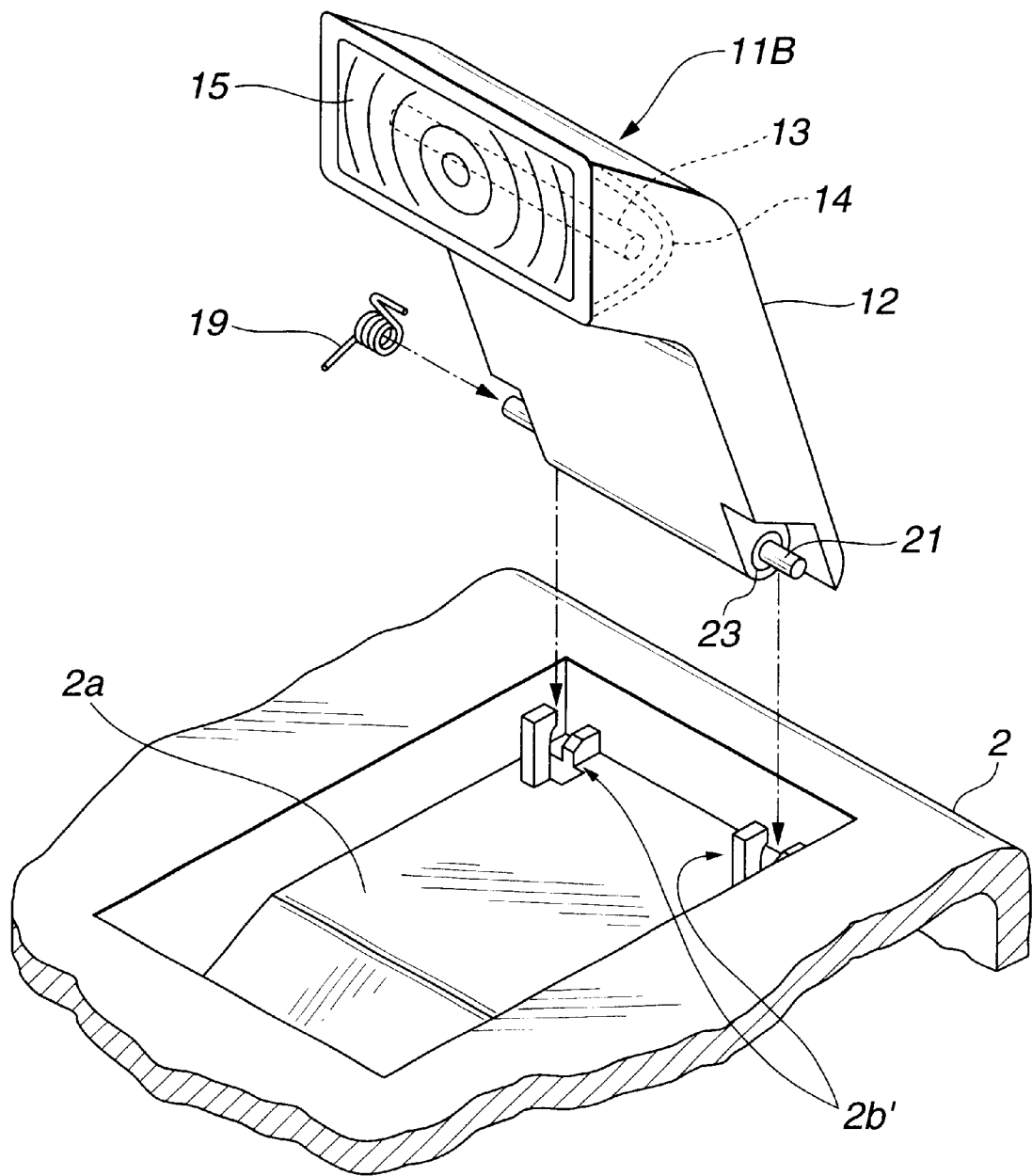
FIG. 8 is a disassembled perspective view of a strobe device according to a second embodiment of the present invention.
Figure 9:
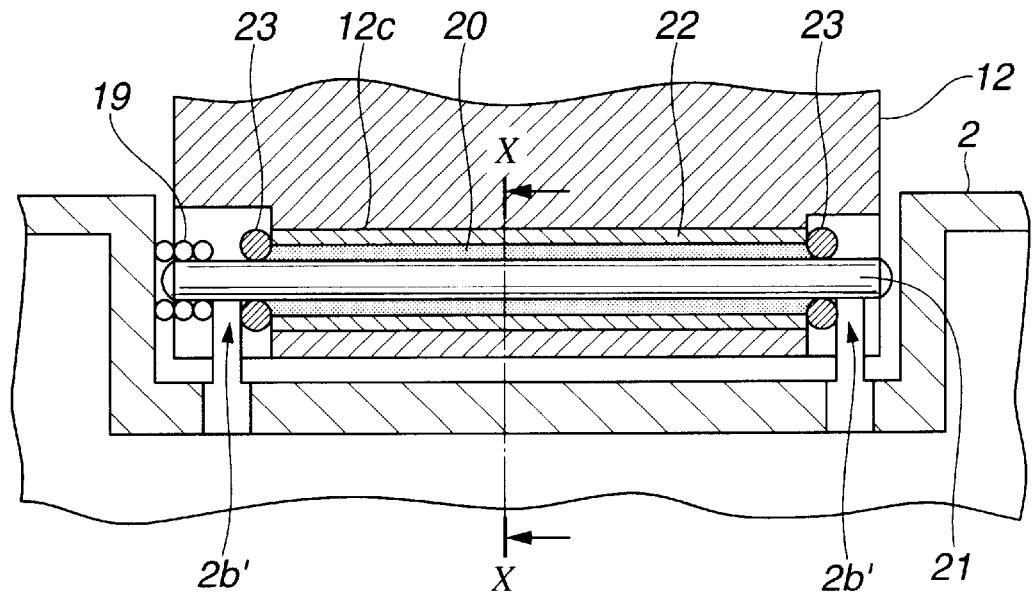
FIG. 9 is a longitudinal-section view of around the bearing portion of the strobe device according to the embodiment shown in FIG. 8.
Figure 10:
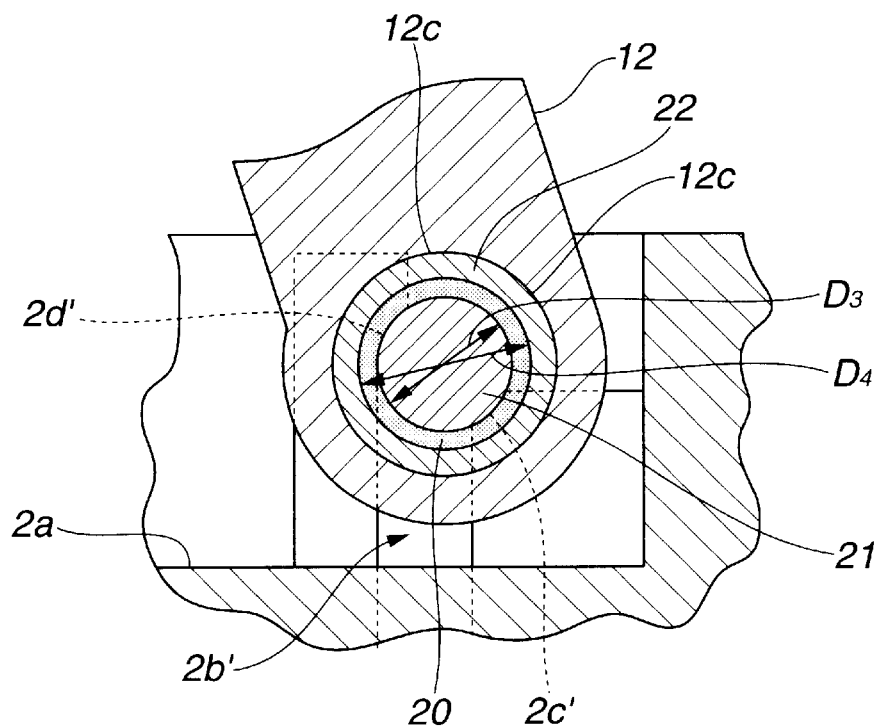
FIG. 10 is a cross-sectional diagram along line X—X in FIG. 9.

FIG. 8 is a disassembled perspective view of this strobe device. FIG. 9 is a longitudinal-section view of around the bearing portion of the strobe device, and FIG. 10 is a cross-sectional diagram along line X—X in FIG. 9.

The camera with the strobe device 11B according to the present embodiment built in is of generally the same configuration as the camera 1 to which the first embodiment is applied.

Also, the strobe device 11B differs from the strobe device 11A according to the first embodiment shown in FIG. 3 only in the structure of the rotational supporting mechanism, as shown in FIG. 8. The following is a description of the differing points.

The rotational supporting mechanism for rotatably supporting the light-emitting portion main unit 12 of the strobe device 11B is a mechanism with a damper device built in, comprising a fixed shaft 21 which is a non-rotational fixed member, a bearing tube 22 which is a hollow rotational bearing member into which the fixed shaft 21 is inserted with a slight gap therebetween, O-rings 23 which are seal members formed of a rubber material abutting against the fixed shaft 21, grease 20 which is a viscous agent, and two bearing supporting portions 2b' provided on the strobe storing chamber 2a of the camera main unit 2.

The bearing supporting portions 2b' have lower protrusions 2c' and upper protrusions 2d' as shown in FIG. 10, and the outer circumference portion of the fixed shaft 21 is pressed into the protrusions.

The bearing tube 22 is pressed into and fixed to a bearing hole 12c on the light-emitting portion main unit 12, and fixed, as shown in FIG. 9. The fixed shaft 21 is then inserted through the bearing tube 22 with grease 20 coated thereon. Or, grease 20 may be injected in the bearing tube gap after insertion.

Now, the O-rings 23 are inserted from both edges of the fixed shaft 21, and brought into contact with both edges of the bearing tube 22. The grease 20 is sealed in by the O-rings 23 on either side, thereby preventing leaking out.

Both ends of the fixed shaft 21 mounted to the light-emitting portion main unit 12 are pressed into the bearing supporting portions 2b' of the strobe storing chamber 2a, and fixed. A pop-up spring 19 is inserted to the tip of the fixed shaft 21.

In the assembled state, the bearing tube 22 is subjected to viscous friction torque as load torque due to the shearing resistance of the grease 20 filled in the gap between the bearing tube 22 and the fixed shaft 21, at the time of the rotation thereof. That is to say, the rotational supporting mechanism made up of the fixed shaft 21, bearing tube 22, and grease 20, also functions as a rotating damper.

The magnitude of the viscous friction torque depends on the gap between the outer diameter D3 of the fixed shaft 21 and the inner diameter D4 of the bearing tube 22 shown in FIG. 10, and the viscosity of the grease 20 to be filled therein. These dimensions and the type of grease are determined such that an appropriate rotational speed is obtained at the time of the pop-up action of the light-emitting portion main unit 12, bouncing is suppressed at the time of reaching the pop-up position, and further such that the load resistance is appropriate for the storing operation, as well.

The pop-up and storing actions of the strobe device 11B according to the present embodiment thus configured will now be described.

In the state with the strobe device stored, as shown in FIG. 1, pressing a pop-up operating button not shown in the drawings to release the retaining state, the light-emitting portion main unit 12 rotates from the storage position P12A to the pop-up position P12B shown in FIG. 2, due to the pressing force of the pop-up spring 19. The rotating speed at this time is suppressed to an appropriate low speed by the viscous friction torque of the grease 20 filled in between the bearing tube 22 and the fixed shaft 21, and at the same time the bouncing upon reaching the pop-up position P12B is suppressed by the damping effects thereof.

On the other hand, in order to store the light-emitting portion main unit 12 in the pop-up position P12B back to the storage position P12A, the back side of the light-emitting portion main unit 12 is pressed and rotated against the pressing force of the pop-up spring 19, and thus the light-emitting portion main unit 12 is stored in the strobe storing chamber 2a of the camera main unit. Viscous friction torque of the grease filled in between the bearing tube 22 and the fixed shaft 21 also acts at this time, but the torque is of a level that does not impede this operation in particular.

According to the strobe device 11B according to the second embodiment of the present invention as described above, the rotational supporting mechanism having a simple damping device made up of the fixed shaft 21, bearing tube 22, and grease 20, supports the light-emitting portion main unit 12, and accordingly stable low-speed rotation and shock-absorbing capabilities can be obtained at the time of pop-up. Also, the above rotational supporting mechanism is capable of being assembled into spaces where conventional dedicated damper devices could not be provided, thus realizing reduction in size and costs of cameras.

Next, description will be made regarding a third embodiment of the strobe device according to the present invention, which is a flash-emitting device.

Figure 11:
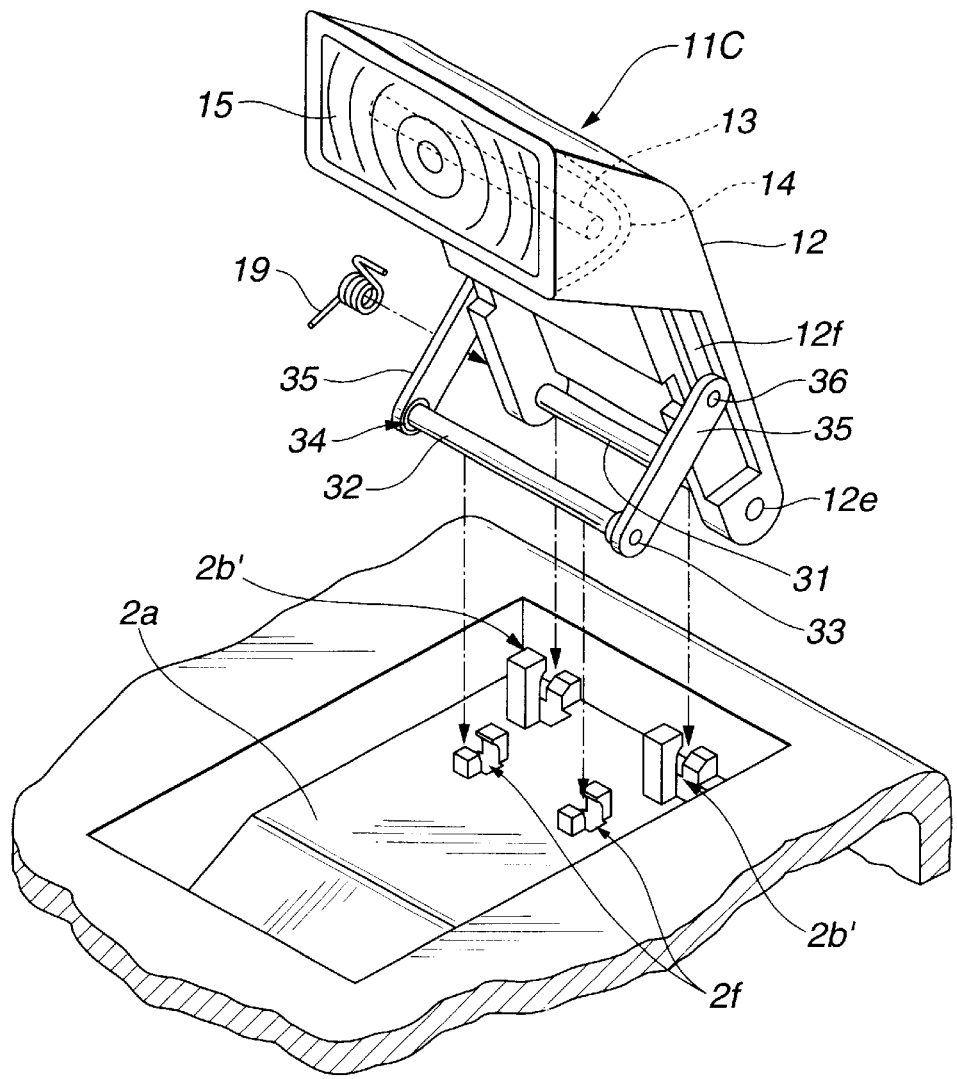
FIG. 11 is a disassembled perspective view of a strobe device according to a third embodiment of the present invention.
Figure 12:
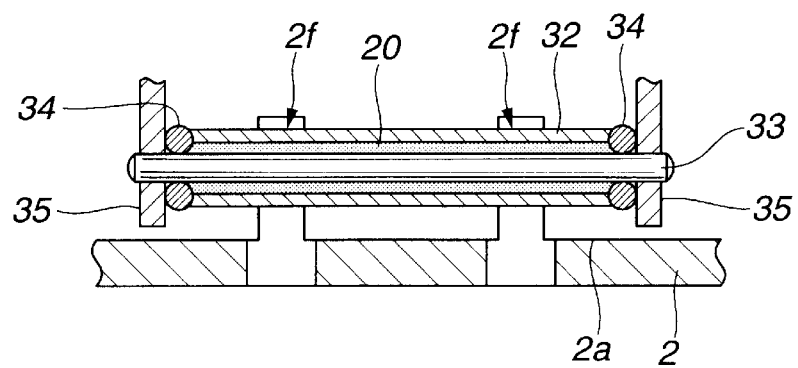
FIG. 12 is a longitudinal-section view of around the bearing portion of the strobe device according to the embodiment shown in FIG. 11.

FIG. 11 is a disassembled perspective view of this strobe device. FIG. 12 is a longitudinal-section view of around the bearing portion of the strobe device.

The camera with the strobe device 11C according to the present embodiment built in is of generally the same configuration as the camera 1 to which the first embodiment is applied.

Also, the strobe device 11C differs from the strobe device 11A according to the first embodiment shown in FIG. 3 only in the structure 6f the rotational supporting mechanism of the light-emitting portion main unit, as shown in FIG. 11. The following is a description of the differing points.

The rotational supporting mechanism for rotatably supporting the light-emitting portion main unit 12 of the strove device 11C is made up of two rotation supporting parts with a damper device built in, one comprising a supporting shaft 31 rotatably fit into a shaft hole 12e serving as the center of rotation of the light-emitting portion main unit 12, supported by a shaft supporting portion 2b' of the strobe storage chamber 2a. The other rotation supporting part is a link supporting part, comprising a bearing tube 32 which is a hollow non-rotational fixed bearing member supported by a bearing supporting part 2f of the strobe storage chamber 2a, a rotating shaft 33 which is a rotating shaft member fit to the bearing tube 32 with a slight gap therebetween, two links 35 which are rotating members with one end slidably and rotatably supported by both sides of the light-emitting portion main unit 12 and the other end fixed to and supported by the rotational shaft 33, two O-rings 34 which are seal members formed of a rubber material, and grease 20 which is a viscous agent.

The shaft supporting portions 2b' and bearing supporting portions 2f are arranged within the strobe storage chamber 2a so as to be mutually parallel, and have lower protrusions and upper protrusions in the same manner as the articles as shown in FIGS. 6 and 10. The outer circumference portions of the supporting shaft 31 or bearing tube 32 can be pressed into the protrusions.

The links 35 have at one end thereof a slide pin 36 capable of being slidably and rotatably fit to a sliding groove 12f on the light-emitting portion main unit 12 as shown in FIG. 11, and at the other end the rotational shaft 33 is fixed.

The rotational shaft 33 is inserted through the bearing tube 32 with grease 20 which is a viscous agent being coated thereon, as shown in FIG. 12, and further the O-rings 34 are inserted to both edges of the rotational shaft 33, and brought into contact with both edges of the bearing tube 32. The grease 20 is sealed in by the O-rings 34 on either side, thereby preventing leaking out. Or, grease 20 may be injected in the gap between the bearing tube 32 and rotational shaft 33 after insertion.

The links 35 are fixed to both ends of the rotational shaft 33 fit into the bearing tube 32. Both ends of the rotational shaft 33 fit into the bearing tube 32 are pressed into the bearing supporting parts 2f of the strobe storage chamber 2a, and fixed.

Also, the supporting shaft 31 which rotatably supports the light-emitting portion main unit 12 has a pop-up spring 19 mounted in the state of pressing the light-emitting portion main unit 12 in the pop-up direction. The light-emitting portion main unit 12 rotates along with the links 35 to the pop-up position P12B due to this pressing force. The pop-up position P12B is defined by the position at the edge of the slide grooves 12f where the slide pins 36 of the links strike.

In the assembled state, the rotational shaft 33 is subjected to viscous friction torque due to the shearing resistance of the grease 20 filled in the gap between the bearing tube 32 and the rotational shaft 33. That is to say, the rotational supporting unit made up of the rotational shaft 33, bearing tube 32, and grease 20, also functions as a rotating damper.

The magnitude of the viscous friction torque depends on the gap between the outer diameter of the rotating shaft 33 and the inner diameter of the bearing tube 32, and the viscosity of the grease 20 to be filled therein. These dimensions, type of grease, and other settings are determined such that an appropriate rotational speed is obtained at the time of the pop-up action of the light-emitting portion main unit 12, and also the damping effects thereof suppresses bouncing at the time of reaching the pop-up position, and further such the load resistance is not too great and is appropriate for the storing operation, as well.

The pop-up and storing actions of the strobe device 11C according to the present embodiment thus configured will now be described.

In the state with the strobe device stored, pressing a pop-up operating button not shown in the drawings to release the retaining state causes the light-emitting portion main unit 12 to rotate from the storage position P12A to the pop-up position P12B, due to the pressing force of the pop-up spring 19. The rotating speed at this time is suppressed to an appropriate low speed by the viscous friction torque of the grease 20 filled in between the bearing tube 32 and the rotating shaft 33 supporting the links 35, and at the same time the bouncing upon reaching the pop-up position P12B is suppressed by the damping effects thereof.

On the other hand, in order to store the light-emitting portion main unit 12 in the pop-up position P12B back to the storage position P12A, the back side of the light-emitting portion main unit 12 is pressed and rotated against the pressing force of the pop-up spring 19, and thus the light-emitting portion main unit 12 is stored in the strobe storing chamber 2a. Viscous friction torque of the grease filled in between the rotating shaft 33 and the bearing tube 32 also acts at this time, but the torque is of a level that does not impede this operation in particular.

According to the strobe device 11C according to the third embodiment of the present invention as described above, the rotational supporting mechanism having a simple damping device made up of the bearing tube 32, rotating shaft 33, and grease 20, supports the light-emitting portion main unit 12, and accordingly stable low-speed rotation and shock-absorbing capabilities can be obtained at the time of pop-up. Also, the above rotational supporting mechanism is capable of being assembled into spaces where conventional dedicated damper devices could not be provided, thus realizing reduction in size and costs of cameras. Particularly, applying the links 35 to the rotational supporting mechanism of the light-emitting portion main unit 12 allows smooth rotation action to be obtained, and at the same time allows the light-emitting portion main unit 12 to pop up to a precise position.

Next, description will be made regarding a fourth embodiment of the strobe device according to the present invention, which is a flash-emitting device.

Figure 13:
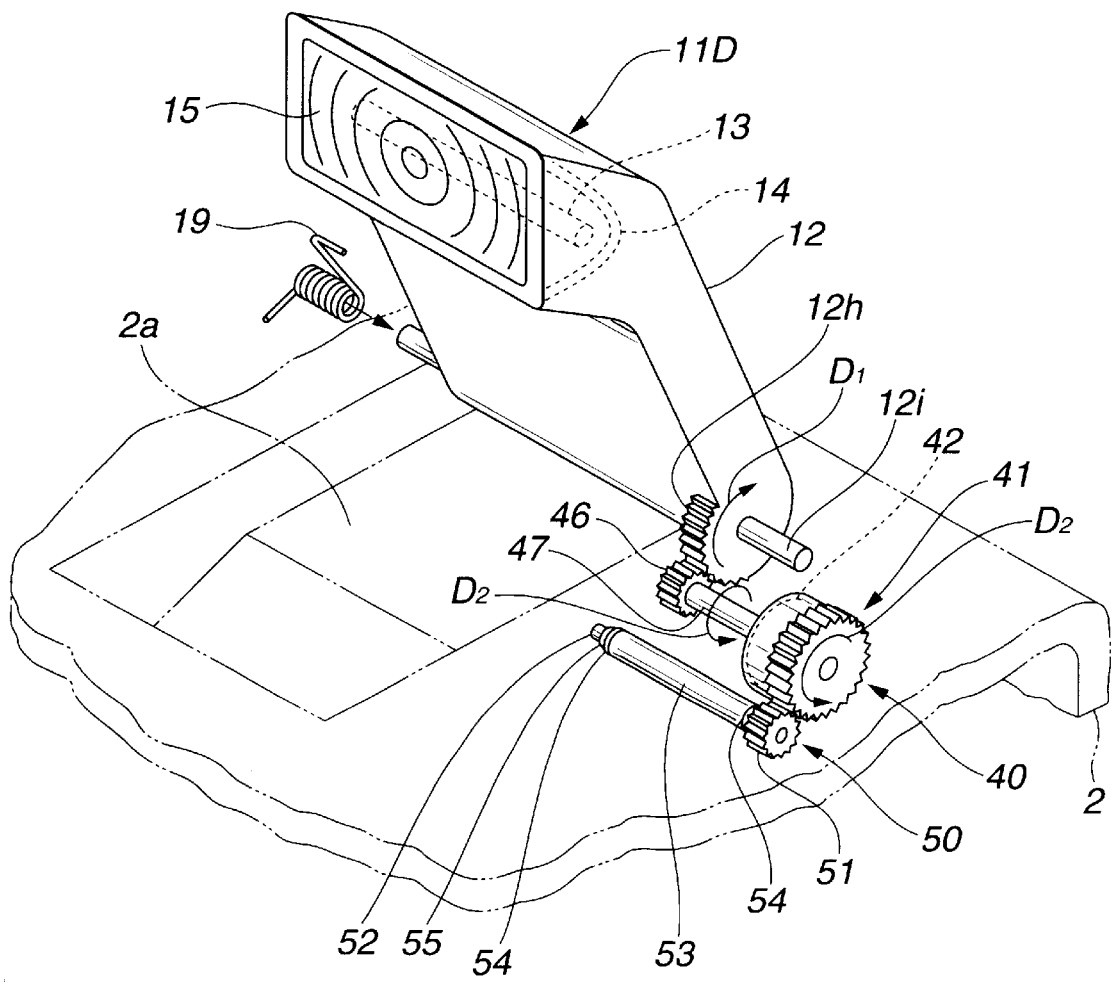
FIG. 13 is a perspective view of a strobe device according to a fourth embodiment of the present invention.
Figure 14:
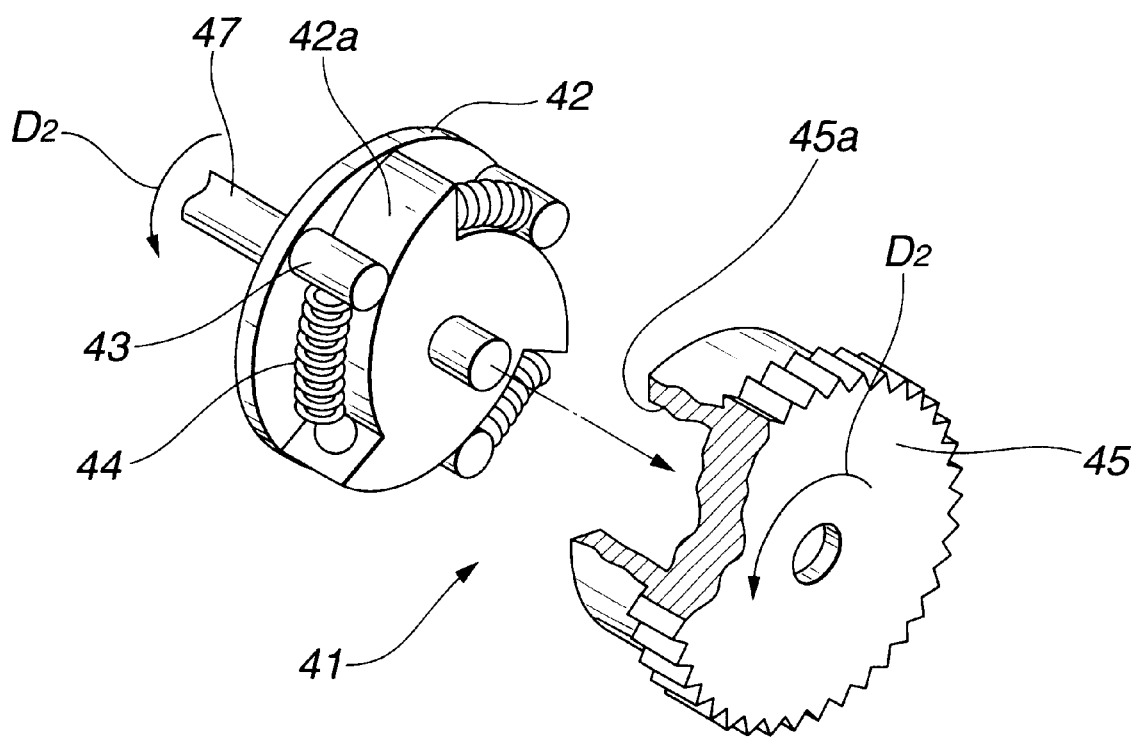
FIG. 14 is a disassembled perspective view of a clutch portion assembled into the rotational supporting mechanism of the strobe device shown in FIG. 13.
Figure 15:
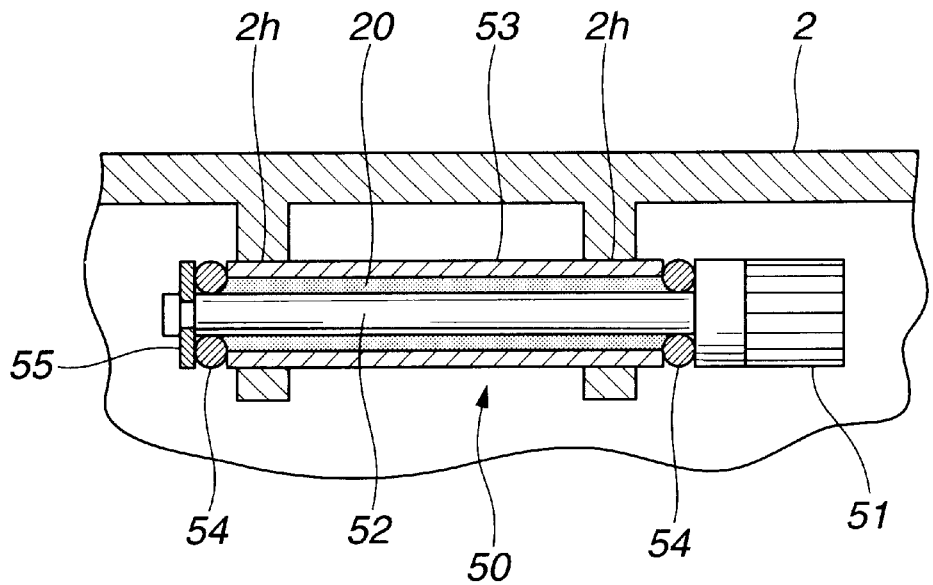
FIG. 15 is a longitudinal-section view of the bearing portion of a rotational damper of the strobe device shown in FIG. 13.

FIG. 13 is a perspective view of this strobe device. FIG. 14 is a disassembled perspective view of a clutch portion built into the rotational supporting mechanism of the strobe device. FIG. 15 is a longitudinal-section view of the bearing portion of a rotational damper.

The camera with the strobe device 11D according to the present embodiment built in is also of generally the same configuration as the camera 1 to which the first embodiment is applied.

Also, the strobe device 11D differs from the strobe device 11A according to the first embodiment shown in FIG. 3 only in the structure of the rotational supporting mechanism of the light-emitting portion main unit, as shown in FIG. 13. The following is a description of the differing points.

The light-emitting portion main unit 12 of the strobe device 11D has, in addition to the light-emitting portion, a supporting shaft 12i rotatably supported by the strobe storage chamber 2a, and a light-emitting portion main unit side gear 12h on the supporting shaft 12i.

The rotational supporting mechanism rotatably supporting the light-emitting portion main unit 12 has built in a damper device, comprising a rotation converting mechanism unit 40 and a rotational damper 50.

The rotation converting mechanism unit 40 is a rotation converting unit making up a speed-increasing driving system, comprising a rotational shaft 47, a gear 46 fixed to the rotational shaft 47 and meshing with the light-emitting portion main unit side gear 12h, and a clutch unit 41 having a clutch main unit 42.

As shown in the disassembled perspective view in FIG. 14, the clutch unit 41 is a unidirectional clutch for transmitting the counter-clockwise rotation in the D2 direction of the rotational shaft 47, comprising a clutch main unit 42 fixed to the rotational shaft 47, rollers 43, compression springs 44, and a gear 45 rotatably supported by the rotational shaft 47. Clutch cam parts 42a are provided to the clutch main unit 42, and an inner face 45a over which the rollers 43 can slide is provided to the gear 45.

With the above clutch unit 41, in the event that the rotational shaft 47 rotates in the D2 direction (i.e., in the counter-clockwise direction), the rollers 43 are pinched between the clutch cam parts 42a of the clutch main unit 42 and the inner face 45a of the gear 45, and thus the driving force in the D2 direction is transmitted to the gear 45. In the event that the rotation shaft 47 rotates in the reverse-D2 direction (clockwise), the pinched state of the rollers 43 between the clutch cam parts 42a of the clutch main unit 42 and the inner face 45a of the gear 45 is released, and thus the driving force in the reverse-D2 direction is not transmitted to the gear 45.

The rotational damper 50 has bearing tube 53 which is a hollow non-rotational fixed bearing member supported by the bearing supporting part 2h of the camera main unit 2 as shown in FIG. 15, a gear 51 for meshing with the gear 45, a rotational shaft 52 which is a rotational shaft member fit into the bearing tube 53 with a slight gap therebetween, two O-rings 54 which are seal members formed of a rubber material, a cir-clip 55, and grease 20 which is a viscous agent.

The rotational shaft 52 is inserted through the bearing tube 53 with grease 20 being coated thereon. The O-rings 54 have been inserted to both edges of the rotational shaft 52 and brought into contact with both edges of the bearing tube 53, and the edges of the O-rings are retained by the cir-clips 55. The grease 20 is sealed in by the O-rings 54 on either side, thereby preventing leaking out. Or, the grease 20 may be injected in the gap between the bearing tube 53 and the rotational shaft 52 following insertion thereof.

The rotational shaft 52 is subjected to viscous friction torque due to the shearing resistance of the grease filled in the gap between the bearing tube 53 and the rotational shaft 52 at the time of the rotation thereof. The magnitude of the viscous friction torque depends on the gap between the outer diameter of the rotational shaft 52 and the inner diameter of the bearing tube 53, and the viscosity of the grease 20 to be filled therein. Settings of these dimensions and type of grease are determined such that an appropriate rotational speed is obtained at the time of the pop-up action of the light-emitting portion main unit 12, bouncing is suppressed at the time of reaching the pop-up position due to the damping effects thereof.

Also, the pop-up spring 19 is mounted to the supporting shaft 12i rotatably supporting the light-emitting portion main unit 12 so as to press the light-emitting portion main unit 12 in the pop-up direction. Also, the gear ratio of the above-described gears is set such that speed increases from the supporting shaft 12i of the light-emitting portion main unit 12 toward the rotational shaft 47 of the rotation converting mechanism unit 40, and further toward the rotation shaft 55 of the rotational damper unit 50. Accordingly, the load of the rotational damper 50 acts with a great load on the supporting shaft 12i of the light-emitting portion main unit 12 by an amount equivalent to the above gear ratio.

In the assembled state, in the event that the light-emitting portion main unit 12 rotates in the D1 direction toward the pop-up position P12B by the pressing force of the pop-up spring 19, the light-emitting portion main unit 12 rotationally moves in a state of the rotational damper unit 50 driven via the rotation converting mechanism unit 40 creating rotational load.

On the other hand, in the event that the light-emitting portion main unit 12 moves in the reverse-D1 direction toward the storage position P12A against the pressing force of the pop-up spring 19, the rotational shaft 47 rotates in the reverse-D2 direction so the clutch unit 41 is released, and there is no transmission of rotation. Accordingly, the load of the rotational damper 50 does not act, and the load of the pop-up spring 19 is the only operating load.

The pop-up and storing actions of the strobe device 11D according to the present embodiment thus configured will now be described.

In the state with the strobe device stored, pressing a pop-up operating button not shown in the drawings releases the retaining state, the light-emitting portion main unit 12 rotates in the D1 direction from the storage position P12A to the pop-up position P12B due to the pressing force of the pop-up spring 19. The rotating speed at the time of this rotating of the light-emitting portion main unit 12 is suppressed to an appropriate low speed by the viscous friction torque of the grease 20 filled in between the bearing tube 53 and the rotational shaft 52 due to the rotational damper 50 being rotationally driven via the clutch unit 41, and at the same time the bouncing upon reaching the pop-up position P12B is suppressed. At the point that the light-emitting portion main unit 12 reaches the pop-up position P12B, the clutch main unit 42 of the clutch unit 41 stops the rotation and is released from the clutch engagement with the gear 45, so the gear 45 and rotational shaft 52 continue rotation under inertia, and do not act upon any shock at the time of the light-emitting portion main unit 12 stopping.

On the other hand, in order to store the light-emitting portion main unit 12 in the pop-up position P12B back to the storage position P12A, the back side of the light-emitting portion main unit 12 is pressed and rotated in the reverse D1 direction against the pressing force of the pop-up spring 19, and at this time the clutch main unit 42 rotates in the reverse-D2 direction so the clutch unit 41 is free and the load of the rotational damper 50 does not act. Accordingly, the light-emitting portion main unit 12 can be rotated and stored in the storage position P12A with an even lighter load.

According to the strobe device 11D according to the fourth embodiment as described above, a unidirectional clutch unit 41 and rotational damper 50 are assembled into the rotational supporting mechanism rotatably supporting the light-emitting portion main unit 12, and accordingly rotation speed can be suppressed and bouncing can be reduced at the time of pop-up of the light-emitting portion main unit 12. At the time of storing, the load of the rotational damper 50 is released by the clutch unit 41, so the storing operation can be performed with a lighter load, thus providing a strobe device which is easier to handle. Also, this arrangement takes up little space, thus realizing reduction in size and costs of cameras.

Figure 16:
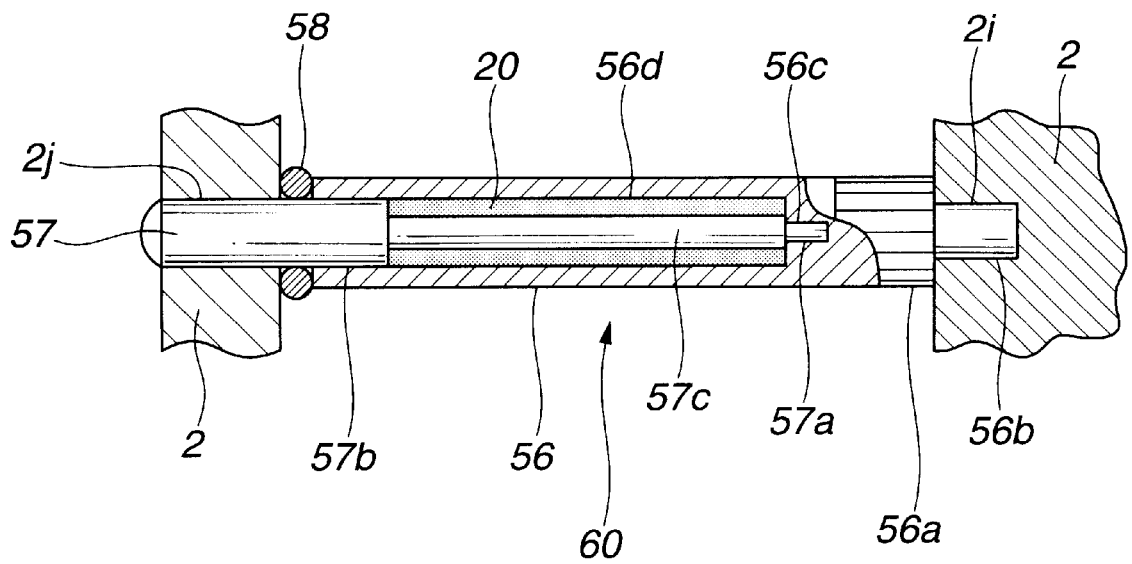
FIG. 16 is a longitudinal-section view of around the bearing portion of a variation of the rotational damper in the strobe device according to the fourth embodiment shown in FIG. 13.

Incidentally, a rotational damper of the configuration shown in the longitudinal-section view in FIG. 16 may be proposed as a variation of the rotational damper 50 applied to the strobe device 11D according to the present embodiment.

The rotational damper 60 according to this variation comprises a bearing tube 56 which is a rotational bearing member having a gear 56a meshing with the gear 45 of the clutch unit 41, a fixed shaft 57 which is a non-rotational fixed shaft member fit to the bearing tube 56 with a slight gap therebetween, an O-ring 58 which is a seal member formed of a rubber material, and grease 20 which is a viscous agent.

The bearing tube 56 has a shaft portion 56b which is rotatably fit into a shaft hole 2i in the camera main unit 2 in addition to the gear 56a, a shaft hole 56c to which the tip shaft portion 57a of the fixed shaft 57 is rotatably fit, and a shaft bearing hole 56d to which a shaft portion 57c of the fixed shaft 57 is fit with a slight gap therebetween.

The fixed shaft 57 has a shaft portion 57b for precisely fitting to the shaft bearing hole 56d, a shaft portion 57c for fitting to the shaft bearing hole 56d with a gap therebetween, and a tip shaft portion 57a, with the shaft portion 57b being pressed into a supporting hole 2j of the camera main unit 2, and fixedly supported.

The fixed shaft 57 is fit into the bearing tube 56 with grease 20 being coated on the shaft portion 57c. The O-ring 58 is mounted to the edge side of the shaft bearing tube 56 on the opposite side of the gear 56a and the bearing tube 56 and fixed shaft 57 are attached to the shaft holes 2i and 2j of the camera main unit 2, and the gear 56a is meshed with the gear 45 of the clutch unit.

Applying the rotational damper 60 according to this variation assembled as described above yields the same advantages as the strobe device 11D according to the fourth embodiment. Particularly, with the rotational damper 60 according to this variation, only one O-ring 58 is necessary, grease leakage can be prevented in a sure manner, and assembly is easy, as well.

Next, description will be made regarding a fifth embodiment of the strobe device according to the present invention, which is a flash-emitting device.

Figure 17:
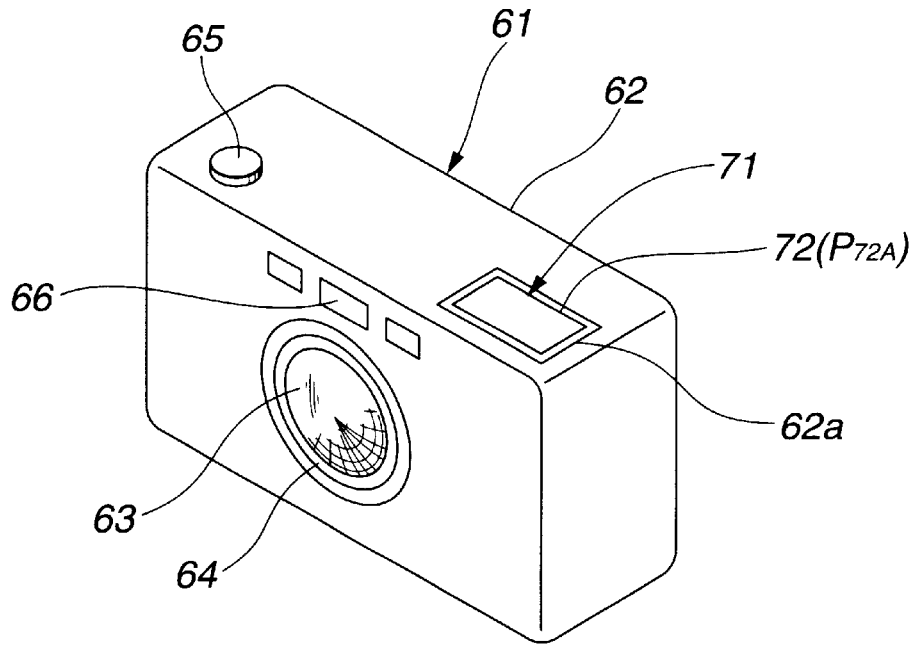
FIG. 17 is a perspective view illustrating an external view of a camera with a built-in strobe device according to a fifth embodiment of the present invention, in a state with the strobe device stored.
Figure 18:
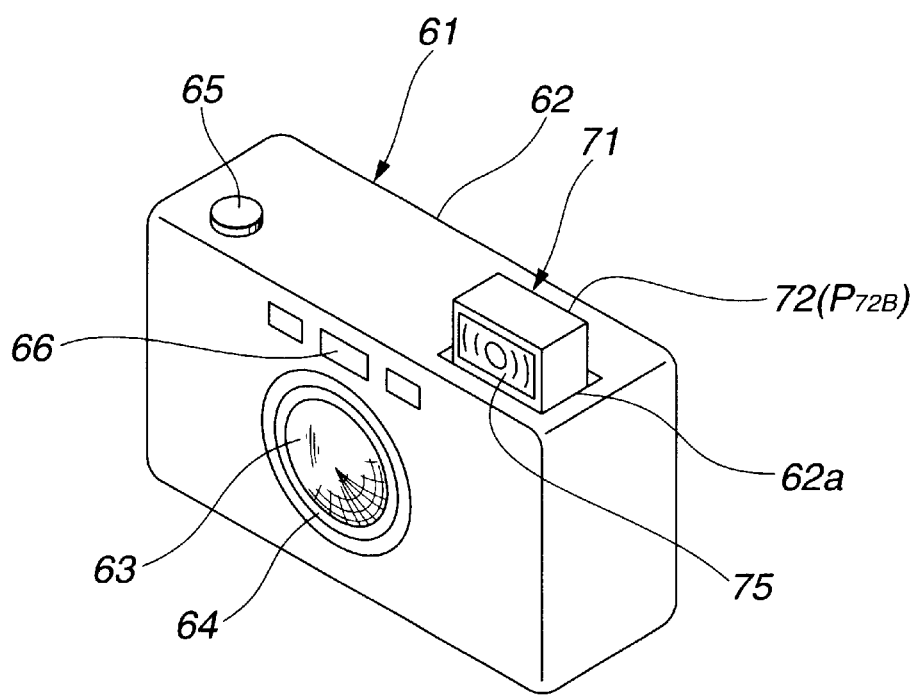
FIG. 18 is a perspective view illustrating an external view of the camera with a built-in strobe device shown in FIG. 17, in a state with the strobe device popped up.
Figure 19:
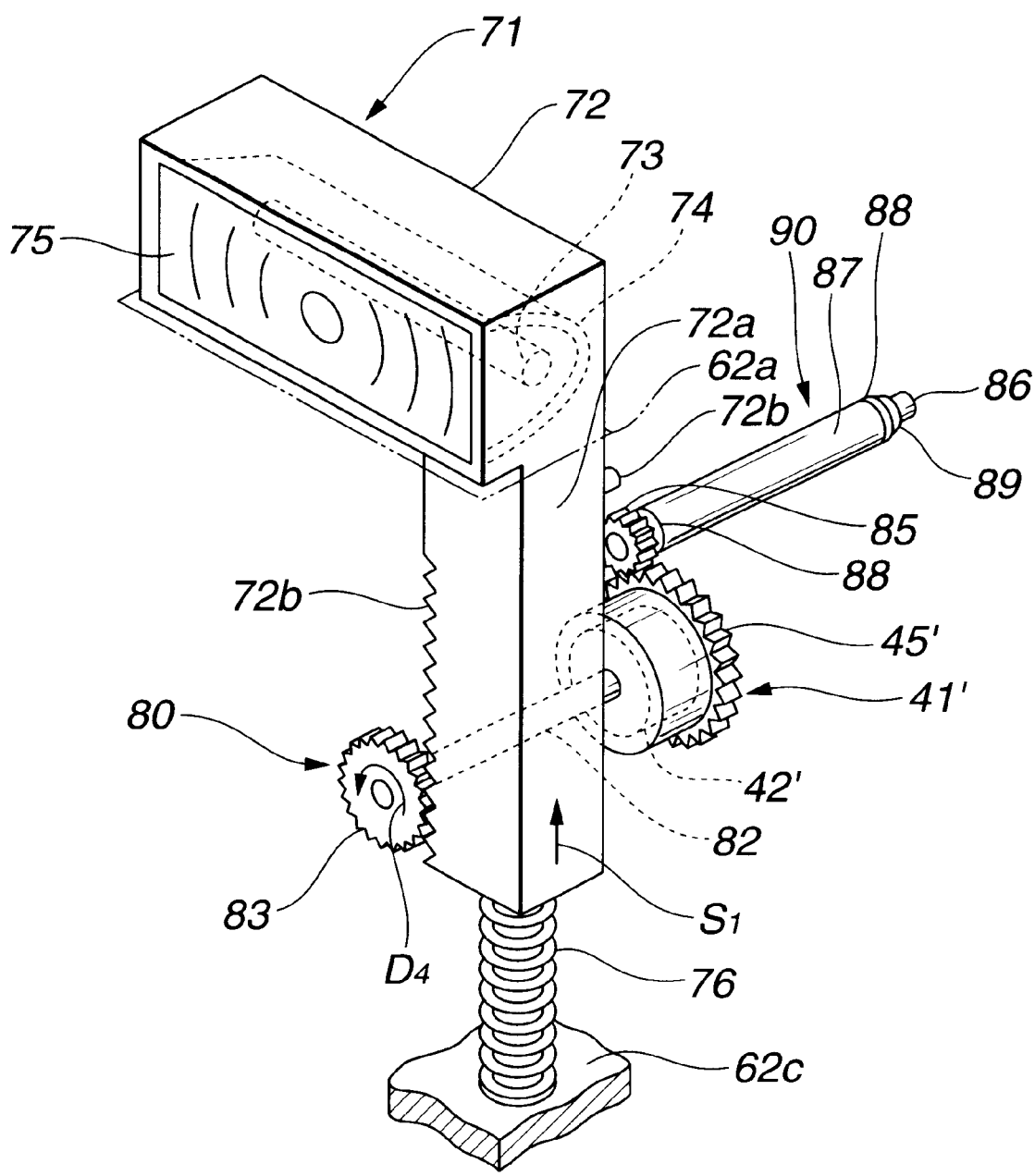
FIG. 19 is a perspective view of the strobe device shown in FIG. 17.

FIGS. 17 and 18 are perspective views illustrating an external view of a camera with the present strobe device built in. FIG. 17 illustrates a state with the strobe device stored, and FIG. 18 illustrates a state with the strobe device popped up. FIG. 19 is a perspective view of the strobe device.

The camera 61 with the strobe device 71 according to the present embodiment built in is a compact camera comprising on a camera main unit 62 a taking lens 63, a strobe device 71, a release switch 65, a viewfinder 66, and so forth, as shown in FIGS. 17 and 18.

The strobe device 71 has a light-emitting portion main unit 72 with a built-in light-emitting portion capable of sliding from a non-light-emitting storage position (first position) P72A shown in FIG. 17 where it is stored to a pop-up position (second position) P72B shown in FIG. 18 so as to be able to emit light. The light-emitting portion main unit 72 has linked thereto a rotation converting mechanism unit 80 for converting the sliding motion of the light-emitting portion main unit 72 into rotation, and a rotational damper 90 (see FIG. 19). The light-emitting portion main unit 72 with the built-in light-emitting portion can be stored in a strobe storing chamber within an opening 62a on the camera main unit 62 shown in FIG. 17.

As shown in FIG. 19, the light-emitting portion of the strobe device 61 comprises a light-emitting portion main unit 72 which is a moving member slidably supported up and down by guides not shown in the drawings on the camera main unit, a flash-emitting tube 73 disposed on the light-emitting portion main unit 72, a reflector 74, a light-emitting window 75, and a pop-up spring 76 for providing the light-emitting portion main unit 72 with force in the pop-up direction (upwards). The pop-up spring 76 is a compression spring positioned between a spring supporting portion 62c of the camera main unit 62 and the light-emitting portion main unit 72.

The light-emitting portion main unit 72 comprises a portion for storing the light-emitting portion, a stem portion 72a extended in the sliding direction (vertical direction), and a rack 72b provided on the stem portion 72a.

The rotation converting mechanism unit 80 comprises a rotational shaft 82 to which a pinion 83 meshing with the rack 72b of the light-emitting portion main unit is fixed, a clutch main unit 42' fixed to the rotational shaft 82, and a clutch unit 41' having a gear 45' rotationally supported on the rotational shaft 82.

The clutch unit 41' is a unidirectional clutch for transmitting the rotation in the D4 direction of the rotational shaft 82 to the gear 45', and has the same functions of the clutch unit 41 shown in FIG. 14, with the direction of transmitting rotation being the only difference. Accordingly, in the event that the clutch main unit 42' rotates in the reverse-D4 direction relative to the gear 45', rotation is not transmitted.

The rotational damper 90 is of the same structure as that of the rotational damper 50 shown in FIG. 15, comprising a shaft bearing tube 87 which is a hollow non-rotational fixed bearing member supported by a bearing supporting part (not shown) of the camera main unit 62, a rotational shaft 86 which is a rotational shaft member fit with a gear 85 for meshing with the gear 45' and fit into the bearing tube 87 with a slight gap therebetween, two O-rings 88 which are seal members formed of a rubber material, a cir-clip 89, and grease 20 which is a viscous agent.

Assembly of the rotational damper 90 is also performed in the same manner as the assembly of the rotational damper 50. Further, the damping functions of the rotational damper 90 are the same as those of the rotational damper 50.

Also, the gear ratio of the above-described gears 45' and 85 is set such that the rotational shaft 86 of the rotation damper unit 90 increases in speed as to the rotational shaft 82 of the rotation converting mechanism unit 80. Accordingly, the load of the rotational damper 90 acts with a great load on the rotational shaft 82 by an amount equivalent to the above gear ratio.

In the assembled state, in the event that the light-emitting portion main unit 72 slides in the S1 direction toward the pop-up position P72B by the pressing force of the pop-up spring 76, the light-emitting portion main unit 72 moves in a state of the rotational damper unit 90 driven via the rotation converting mechanism unit 80 creating rotational load.

On the other hand, in the event that the light-emitting portion main unit 72 moves in the reverse-S1 direction toward the storage position P72A against the pressing force of the pop-up spring 76, the rotational shaft 82 rotates in the reverse-D4 direction so the clutch unit 41 is released, and there is no transmission of rotation. Accordingly, the load of the rotational damper 90 does not act, and the load of the pop-up spring 76 is the only operating load.

The pop-up and storing actions of the strobe device 71 according to the present embodiment thus configured will now be described.

In the state with the strobe device stored, pressing a pop-up operating button not shown in the drawings releases the retaining state of the light-emitting portion main unit 72, and the light-emitting portion main unit 72 slides in the S1 direction from the storage position P72A to the pop-up position P72B due to the pressing force of the pop-up spring 76. The rotational damper 90 is rotatably driven via the clutch unit 41' at the time of this moving. Accordingly, the moving speed of the light-emitting portion main unit 72 is suppressed to an appropriate low speed by the viscous friction torque of the grease 20 filled in between the bearing tube 87 and the rotational shaft 89, and at the same time the bouncing upon reaching the pop-up position P72B is suppressed. At the point that the light-emitting portion main unit 72 reaches the pop-up position P72B, the clutch main unit 42' of the clutch unit 41' stops the rotation and is released from the clutch engagement with the gear 45', so the gear 45' and rotational shaft 86 continue rotation under inertia, and do not act upon any shock at the time of the light-emitting portion main unit 72 stopping.

On the other hand, in order to store the light-emitting portion main unit 72 in the pop-up position P72B back to the storage position P72A, the top side of the light-emitting portion main unit 72 is pressed and slid in the reverse S1 direction against the pressing force of the pop-up spring 76, and at this time the clutch main unit 42' rotates in the reverse-D4 direction so the clutch unit 41' is free and the load of the rotational damper 90 does not act. Accordingly, the light-emitting portion main unit 72 can be pressed and stored in the storage position P72A with an even lighter load.

According to the strobe device 71 according to the fifth embodiment of the present invention as described above, a unidirectional clutch unit 41' and rotational damper 90 are assembled into the rotational supporting mechanism linked to the light-emitting portion main unit 72, and accordingly at the time of pop-up of the light-emitting portion main unit 72, the moving speed is suppressed, and bouncing can be reduced. At the time of storing, the load of the rotational damper 90 is released by the clutch unit 41', so the storing operation can be performed with a lighter load, thus providing a strobe device which is easier to handle. Also, this arrangement takes up little space, thus realizing reduction in size and costs of cameras.

Next, description will be made regarding a sixth embodiment of the strobe device according to the present invention, which is a flash-emitting device.

Figure 20:
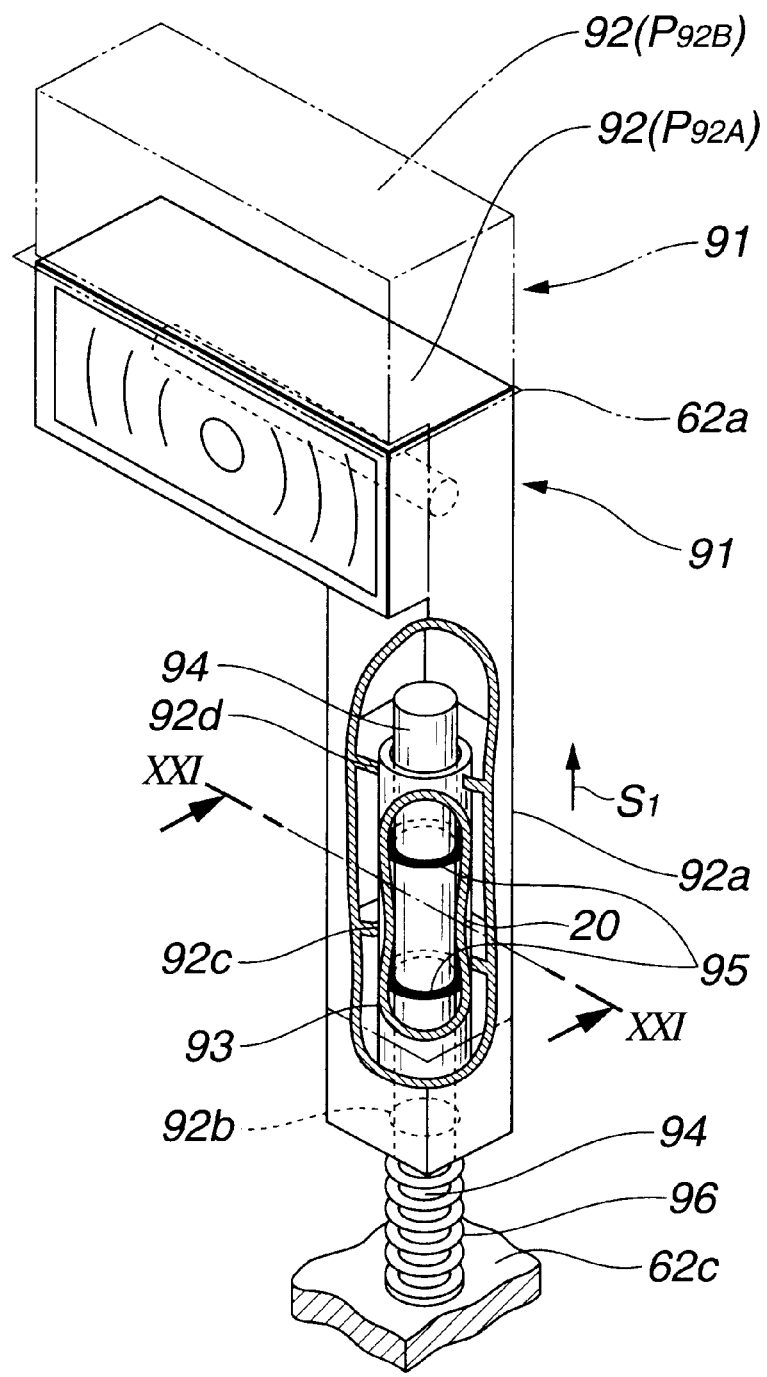
FIG. 20 is a perspective view of a strobe device according to a sixth embodiment of the present invention.
Figure 21:
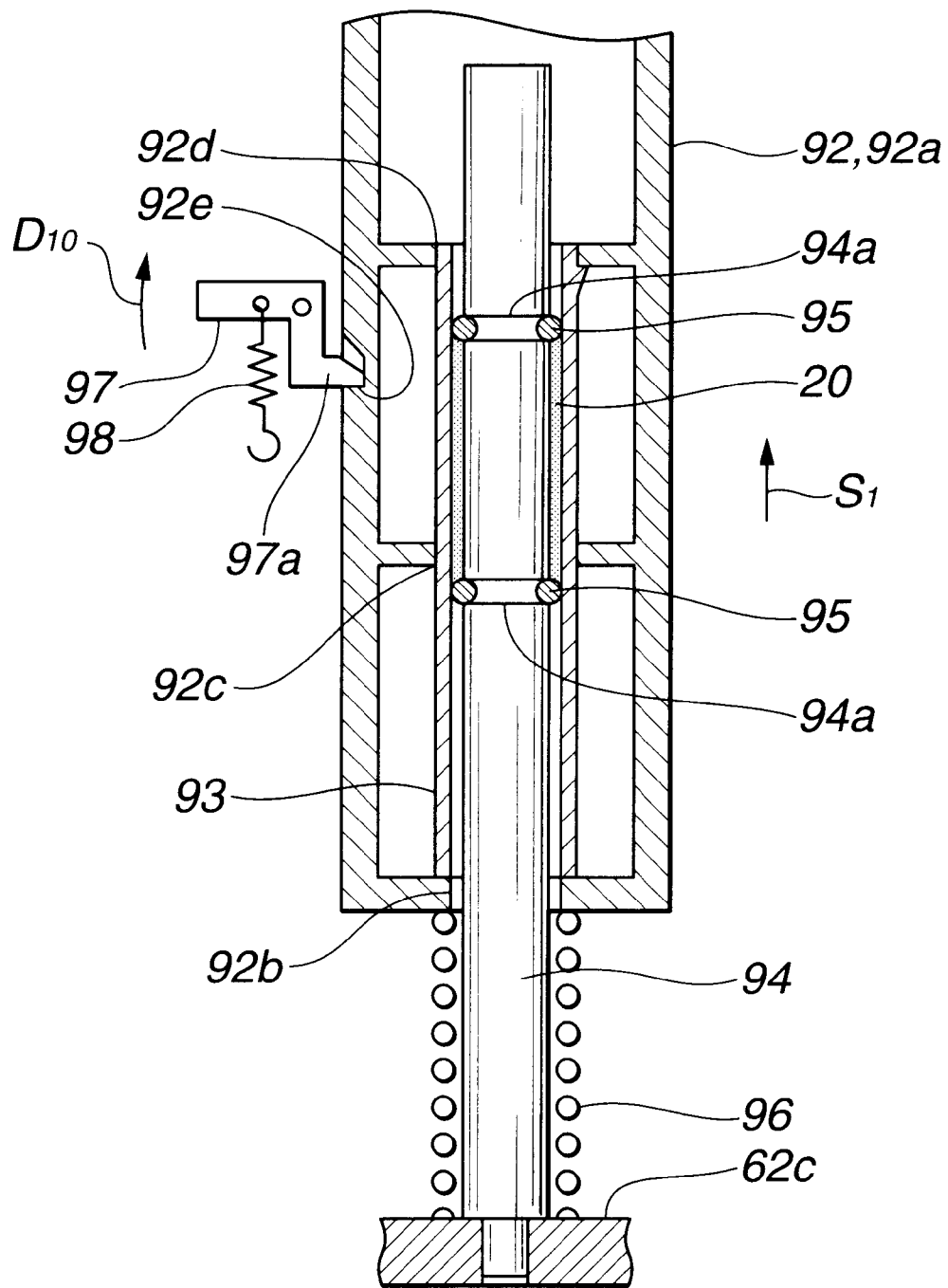
FIG. 21 is a cross-sectional diagram along line XXI—XXI in FIG. 20.

FIG. 20 is a perspective view of a strobe device according to the present embodiment, and FIG. 21 is a cross-sectional diagram along line XXI—XXI in FIG. 20.

The camera with the strobe device 91 according to the present embodiment built in is a compact camera the same as the camera shown in FIGS. 17 and 18 with the fifth embodiment.

The strobe device 91 has a light-emitting portion main unit 92 of a sliding member with a built-in light-emitting portion, and the light-emitting portion main unit 92 is capable of sliding between a non-light-emitting storage position (first position) P92A and a light-emitting pop-up position (second position) P92B via the opening 62a on the camera main unit, as shown in FIG. 20.

As with the light-emitting portion main unit 72 shown in FIG. 19, the light-emitting portion main unit 92 has built in a light-emitting portion comprising a light-emitting window, a flash-emitting tube, a reflector, etc., supported movably in the direction S1 via a moving device.

As shown in FIGS. 20 and 21, the moving device is configured of a stem portion 92a of the light-emitting portion main unit 92, a damper device, a pop-up spring 97 formed of a compression spring, and so forth. The damper device comprises a cylinder member 93 which is a guided member, a guide shaft 94 which is a guiding member, and grease 20 which is a viscous agent.

An opening hole 92b and supporting holes 92c and 92d are provided on the lower face of the stem portion 92a of the light-emitting portion main unit 92. The cylinder member 93 fits with the supporting holes 92c and 92d, and the axialdirection position thereof is restricted and supported by the opening hole 92b and supporting hole 92d, so as to integrally slide with the light-emitting portion main unit 92.

The guide shaft 94 is fixed to the camera main unit—side supporting portion 62c, and further fit into the inner circumference of the cylinder member 93.

Two ring grooves 94a are provided at a position wherein the cylinder member 93 is to be fit which is separated from the guide shaft 94 by a predetermined distance, and two O-rings 95 which are seal members are fit to the ring grooves 94a. The cylinder member 93 is slidably fit onto the outer circumference of the two O-rings 95 in the S1 direction.

Grease 20 is then filled in the fitting gap between the guide shaft 94 and the cylinder member 93, between the two O-rings 95. Friction resistance acts at the time of relative movement between the guide shaft 94 and the cylinder member 93 due to the viscosity of the grease 20 filled therein. Also, the grease 20 filled therein is sealed in by the two O-rings 95, thereby preventing leaking out.

The pop-up spring 96 is inserted between the camera main unit supporting portion 62c and the bottom face of the light-emitting portion main unit stem portion 92a, in a state fit to the guide shaft 94, so as to constantly press the light-emitting portion main unit stem portion 92a in the S1 direction which is the pop-up direction, at all times.

The light-emitting portion main unit 92 is maintained in the storage position P92A by a latch lever 97, as shown in FIG. 21. That is to say, the latch lever 97 is rotatably supported by the camera main unit and is pressed in the reverse-D10 direction by a pressing spring 98, with a claw 97a of the latch lever 97 engaging a retaining groove 92e on the light-emitting portion main unit so as to store the light-emitting portion main unit 92 in the storage position P92A.

The pop-up and storing actions of the strobe device 91 according to the present embodiment thus configured will now be described.

In the state with the strobe device stored, pressing a pop-up operating button not shown in the drawings rotates the latch lever 97 in the D10 direction, which releases the retaining state and frees the light-emitting portion main unit 92. The light-emitting portion main unit 92 rises in the S1 direction and pops up to the pop-up position P92B due to the pressing force of the pop-up spring 96. Suitable sliding resistance acts between the guide shaft 94 and the cylinder member 93 due to the grease 20 filled in between the gap between the guide shaft 94 and the cylinder member 93 in the process of rising in the S1 direction. Accordingly, the moving speed of the light-emitting portion main unit 92 is suppressed to an appropriate low speed and shock and bouncing upon reaching the pop-up position P92B is suppressed.

In order to store the light-emitting portion main unit 92 in the pop-up position P92B back to the storage position P92A, the top side of the light-emitting portion main unit 92 is pressed and slid in the reverse S1 direction against the pressing force of the pop-up spring 96, thereby storing in the storage position P92A.

According to the strobe device 91 according to the sixth embodiment as described above, at the time of pop-up of the light-emitting portion main unit 92, shock and bouncing can be reduced, due to a simple damper device structure wherein grease is filled in the gap between the guide shaft and cylinder member. Also, this arrangement takes up little space, thus realizing reduction in size and costs of cameras.

Next, description will be made of a mirror mechanism of a single-reflex camera to which the moving device according to the seventh embodiment of the present invention is applied.

Figure 22:
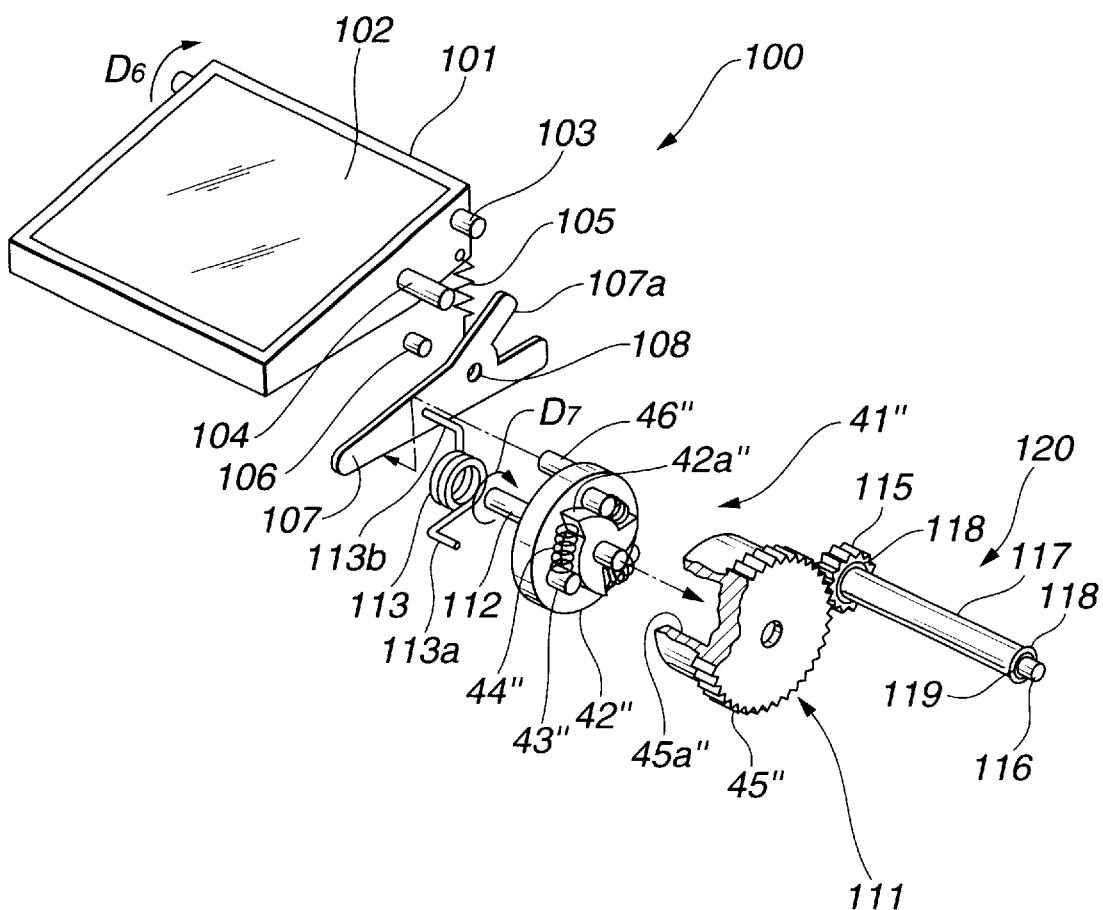
FIG. 22 is a disassembled perspective view of a viewfinder mirror mechanism of a camera which is a moving device according to a seventh embodiment of the present invention.
Figure 23:
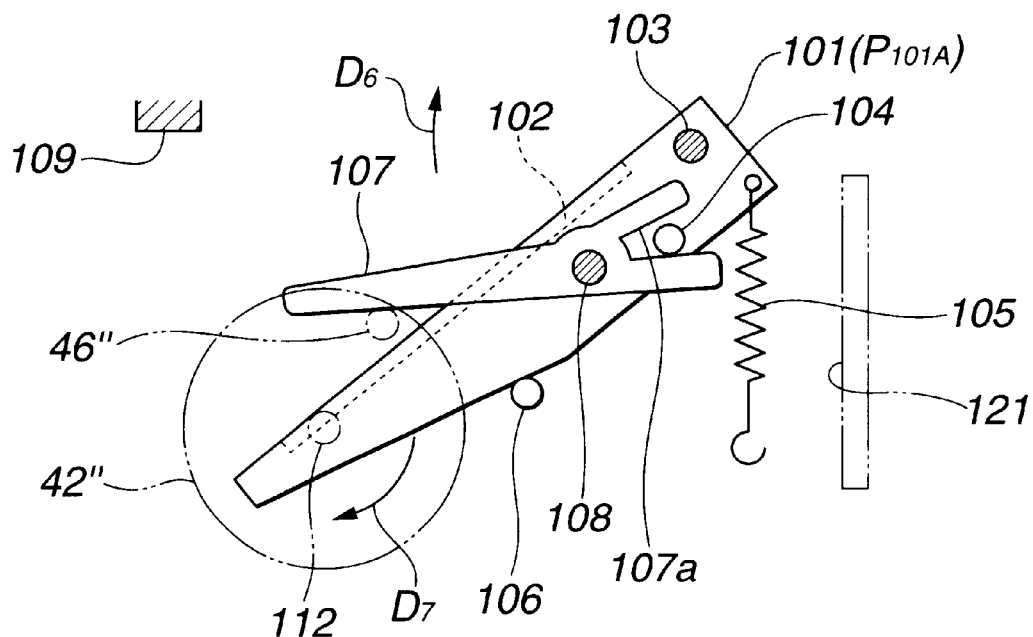
FIG. 23 is a side view of the viewfinder mirror mechanism shown in FIG. 22 in a state that the mirror is inclined.
Figure 24:
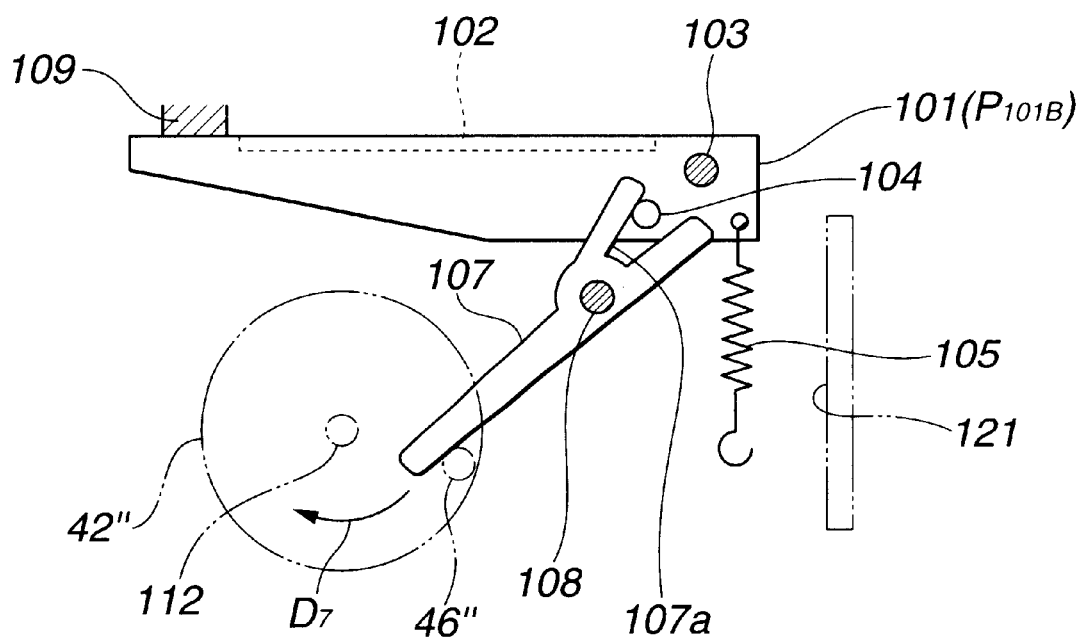
FIG. 24 is a side view of the viewfinder mirror mechanism shown in FIG. 22 in a state that the mirror is retracted.

FIG. 22 is a disassembled perspective view of the viewfinder mirror mechanism of the camera, and FIGS. 23 and 24 are side views of the viewfinder mirror mechanism. FIG. 23 illustrates the mirror mechanism in an inclined state wherein observation can be made by the viewfinder, and FIG. 24 illustrates the mirror mechanism in a retracted state wherein observation cannot be made by the viewfinder.

The mirror mechanism 100 of the camera according to the present embodiment is a mirror mechanism with a damper device built in, more specifically a mirror driving mechanism for performing rotational driving of a movable mirror 102 in a reflecting position (inclined position) inclined between the taking lens and film 121 to a retracted position (terminal position) at the time of exposing film, the mechanism comprising the rotationally movable mirror 102 held by a mirror main unit 101 which is a moving member (a mirror lifter), a linkage lever 107 linked to the mirror main unit 101, a rotation converting mechanism 111, a rotational damper 120, and a mirror return driving unit not shown in the drawings.

As shown in FIG. 22, the mirror main unit 101 is rotatably supported to the camera main unit not shown in the drawing by a supporting shaft 103, and is rotationally pressed by a mirror-up spring 105 in the D6 direction which is the mirror-up direction. The camera main unit is provided with a stopper 106 for positioning the mirror main unit 101 at the inclined position (first position) P101A.

The linkage lever 107 is rotatably disposed by a supporting hole 108 fitting to a shaft provided to the camera main unit not shown in the drawing. A forked portion 107a is provided at the tip of the linkage lever 107, and a driving pin 104 for the mirror main unit 101 is assembled in a manner so as to be able to make contact with the forked portion 107a.

The rotation converting mechanism 111 comprises a rotating shaft 112, and a clutch unit 41" having a clutch main unit 42" and a rotating gear 45". Also, the clutch main unit 42" is fixed to the rotating shaft 112 and has clutch cams 42a", and has built-in clutch rollers 43" capable of coming into contact with the clutch cams 42a", and clutch springs 44". The gear 45" rotates as to the rotating shaft 112.

The clutch unit 41" is a unidirectional clutch for transmitting the rotation in the D7 direction of the rotational shaft 112 to the gear 45", and has the same functions as the clutch unit 41 shown in FIG. 14, with the direction of transmitting rotation being the only difference. Accordingly, in the event that the clutch main unit 42" rotates in the reverse-D7 direction relative to the gear 45", rotation of the clutch main unit 42" and the gear 45" is not transmitted.

A slave pin 46" is fixed to the rear side of the face on which the clutch cams of the clutch main unit 42" are disposed, and further a returning spring (torsion spring) 113 is hung thereupon for keeping the slave pin 46" in constant contact with the linkage lever 107. One end 113a of the returning spring 113 is hung on the clutch main unit 42", and the other end 113b is hung on a camera main unit portion not shown in the drawing. Note, however, that the pressing torque of the returning spring 113 as to the linkage lever 107 is smaller than the pressing torque of the mirror-up spring 105.

The rotational damper 120 is of the same structure as that of the rotational damper 50 shown in FIG. 15, comprising a shaft bearing tube 117 which is a hollow non-rotational fixed bearing member supported by a bearing supporting part (not shown) of the camera main unit, a rotational shaft 116 which is a rotational shaft member fit with a gear 115 for meshing with the gear 45" and fit into the bearing tube 117 with a slight gap therebetween, two O-rings 118 which are seal members formed of a rubber material, a cir-clip 119, and grease 20 which is a viscous agent.

Assembly of the rotational damper 120 is also performed in the same manner as the assembly of the rotational damper 50. Further, the damping functions of the rotational damper 120 are the same as those of the rotational damper 50.

The driving actions of the mirror mechanism of the camera according to an embodiment with a configuration such as described above, will be described with reference to FIGS. 23 and 24.

In the event that the mirror main unit 101 is in the inclined position P101A shown in FIG. 23, releasing a mirror retaining part (not shown) before starting exposure of the film 121 causes the mirror main unit 101 to start rotating by the pressing force of a mirror-up spring 105 in the D6 direction which is the mirror-up direction. The arm of the forked portion 107a is pressed by the driving pin 104 due to the rotation of the mirror main unit 101, and the linkage lever 107 rotates in the counter-clockwise direction. The clutch main unit 42" is then rotationally driven in the D7 direction via the driving pin 46".

The rotation of the clutch main unit 42" in the D7 direction is transmitted to the gear 45" by the clutch unit 41". The rotation thereof is transmitted to the rotational shaft 116 of the rotational damper 120 via the gears 45" and 115 which are a speed-increasing driving system.

The mirror main unit 101 comes into contact with a stopper 109 at the camera main unit side, and stops at the terminal position (second position) P101B wherein the movable mirror 102 is retracted (see FIG. 24). During the rotation operation, a great load resistance acts upon the mirror main unit 101 since the rotational damper 120 rotates at high speed. Accordingly, the mirror main unit 101 rotates in a state with the rotational speed thereof suppressed, so the shock at the time of stopping at the terminal position is alleviated, reducing bouncing of the movable mirror 102. At the point that the mirror main unit 101 comes into contact with a stopper 109, the clutch main unit 42" of the clutch unit 41" stops the rotation and is released from the clutch engagement with the gear 45", so the gear 45" and rotational shaft 116 continue rotation under inertia, and do not act upon any shock at the time of the mirror stopping.

Next, in the event or returning the movable mirror 102 to the inclined position, the mirror main unit 101 is rotated in the reverse-D6 direction by a returning driving unit not shown in the drawings. During the rotating driving thereof, the linkage lever 107 receives clockwise pressing force from the returning spring 113 via the driving pin 46" of the clutch main unit 42" which is in a released state. Also, the clutch main unit 42" rotates in the reverse-D7 direction, engaging with the clutch unit 41" is in a released state, and the rotational damper 120 is cut off. Accordingly, the mechanism acts to reduce the load on the mirror main unit 101.

According to the mirror mechanism 100 of the camera according to the seventh embodiment as described above, providing a rotation converting mechanism 111 containing a unidirectional clutch unit 41" linked to the mirror main unit 101 and a rotational damper 120 restricts the rotational speed of the mirror main unit 101 at the time of raising the movable mirror 102, the force of shock at the terminal position is lessened and bounding of the movable mirror 102 can be suppressed. Also, the structure of the rotational damper 120 serving as the load is simple, and manufacturing costs are inexpensive.

Note that in the above fourth, fifth, and seventh embodiments, the rotation converting mechanism is configured of a speed-increasing driving system, but the rotation converting mechanism does not have to be a speed-increasing driving system if the load of the rotational damper is increased, and in this case may be a speed-reducing driving system instead.

As described above, according to the flash-emitting devices or moving devices in cameras according to the embodiments of the present invention, a viscous agent is filled and sealed in a slight gap between a rotational or moving shaft or bearing member for linking so as to restrict the moving speed of a flash-emitting unit or moving member and a fixed bearing or shaft member fitting to the rotational or moving member. Accordingly, a damper device for a flash-emitting device or moving device for a camera can be provided with a simple structure, and which takes up very little space.

What is claimed is:

1. A damper device for a camera, comprising:
    a rotational moving member that is movable between a closed position and an open position;
    a spring storing deforming energy for moving said rotational moving member to the open position;
    a rotational shaft coupled to said rotational moving member;
    a fixed bearing fitted to said rotational shaft, with said rotational shaft being rotatable relative to said fixed bearing;
    a viscous agent filled in between said rotational shaft and said fixed bearing for consuming said deforming energy stored by said spring when said rotational moving member is moved to the open position; and
    a seal member for sealing in said viscous agent filled in between said rotational shaft and said fixed bearing.

2. A damper device according to claim 1, wherein said viscous agent is grease.

3. A damper device according to claim 1, wherein said seal member is an O-ring.

4. A damper device for a camera, comprising:
    a rotational moving member that is movable between a closed position and an open position;
    a spring storing deforming energy for moving said rotational moving member to the open position;
    a rotational bearing coupled to said rotational moving member;
    a fixed shaft fitted to said rotational bearing, with said rotational bearing being rotatable relative to said fixed shaft;
    a viscous agent filled in between said rotational bearing and said fixed shaft for consuming said deforming energy stored by said spring when said rotational moving member is moved to the open position; and
    a seal member for sealing in said viscous agent filled in between said rotational bearing and said fixed shaft.

5. A damper device according to claim 4, wherein said viscous agent is grease.

6. A damper device according to claim 4, wherein said seal member is an O-ring.

7. A damper device for a camera, comprising:
    a moving member movably provided on said camera to be movable between a closed position and an open position;
    a spring storing deforming energy for moving said moving member to the open position;

a guide member for guiding movement of said moving member;

a guided member for being guided by said guide member;

a viscous agent filled in between said guide member and said guided member for consuming said deforming energy stored by said spring when said moving member is moved to the open position; and a seal member for sealing in said viscous agent filled in between said guide member and said guided member.

8. A damper device according to claim 7, wherein said viscous agent is grease.

9. A damper device according to claim 7, wherein said seal member is an O-ring.

10. A damper device for a camera, comprising:

a moving member movably provided on said camera;

a spring storing deforming energy for moving said moving member;

a guide member for guiding movement of said moving member;

a guided member for being guided by said guide member;

a viscous agent filled in between said guide member and said guided member for consuming said deforming energy stored by said spring while said moving member moves; and a seal member for sealing in said viscous agent filled in between said guide member and said guided member wherein said guide member and said guided member move rectilinearly relative to each other.

11. A damper device according to claim 7, wherein said guide member and said guided member move rotationally relative to each other.

* * * * *